US012777423B2

(12) United States Patent
Xu et al.

(10) Patent No.: US 12,777,423 B2
(45) Date of Patent: Oct. 27, 2026

(54) POWER SHARING FOR UNUSED UPLINK OCCASIONS

(71) Applicant: QUALCOMM Incorporated, San Diego, CA (US)

(72) Inventors: Huilin Xu, Temecula, CA (US); Kazuki Takeda, Minato-ku (JP); Diana Maamari, San Diego, CA (US); Ahmed Elshafie, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 303 days.

(21) Appl. No.: 18/584,589

(22) Filed: Feb. 22, 2024

(65) Prior Publication Data

US 2024/0292340 A1 Aug. 29, 2024

Related U.S. Application Data

(60) Provisional application No. 63/486,849, filed on Feb. 24, 2023.

(51) Int. Cl.
*H04W 52/14* (2009.01)
*H04W 52/34* (2009.01)

(52) U.S. Cl.
CPC ....... *H04W 52/146* (2013.01); *H04W 52/346* (2013.01)

(58) Field of Classification Search
CPC ... H04W 52/34; H04W 52/146; H04W 52/14; H04W 52/346
See application file for complete search history.

(56) References Cited

U.S. PATENT DOCUMENTS 9,357,510 B2 * 5/2016 Damnjanovic ....... H04W 72/21
2020/0221399 A1 * 7/2020 Hosseini ............. H04W 52/367

FOREIGN PATENT DOCUMENTS

WO 2015153382 10/2015

OTHER PUBLICATIONS

International Search Report and Written Opinion—PCT/US2024/017004—ISA/EPO—Jun. 24, 2024.

(Continued)

*Primary Examiner* — Tuan H Nguyen
(74) *Attorney, Agent, or Firm* — Harrity & Harrity, LLP

(57) ABSTRACT

Various aspects of the present disclosure generally relate to wireless communication. Some aspects relate generally to power sharing for unused uplink occasions. Some aspects more specifically relate to adjusting dynamic transmit power sharing between a master cell group (MCG) and a secondary cell group (SCG) for an unused uplink occasion that is reported by a user equipment (UE). The UE may transmit an uplink communication (for example, that overlaps in the time domain with the unused uplink occasion) using a transmit power that is determined using the adjusted dynamic transmit power sharing. The UE may allocate at least a portion of a reserved transmit power associated with the unused uplink occasion to the transmit power of the uplink communication. For the transmit power determination of the uplink communication, the UE may assume that the unused uplink occasion is not present (for example, is not transmitted) in the MCG.

30 Claims, 11 Drawing Sheets

(56) References Cited

OTHER PUBLICATIONS

NTT Docomo: "Transmit Power Control for Dual Connectivity", 3GPP TSG RAN WG1 Meeting #76bis, R1-141469, 3rd Generation Partnership Project, Mobile Competence Centre, 650, Route Des Lucioles, F-06921 Sophia-Antipolis Cedex, France, vol. RAN WG1, No. Shenzhen, China, Mar. 31, 2014-Apr. 4, 2014, Mar. 30, 2014, pp. 1-8, XP050787138, Section 3, p. 2-p. 7.

* cited by examiner

POWER SHARING FOR UNUSED UPLINK OCCASIONS

CROSS-REFERENCE TO RELATED APPLICATION

This Patent Application claims priority to U.S. Provisional Patent Application No. 63/486,849, filed on Feb. 24, 2023, entitled "POWER SHARING FOR UNUSED UPLINK OCCASIONS," and assigned to the assignee hereof. The disclosure of the prior Application is considered part of and is incorporated by reference into this Patent Application.

FIELD OF THE DISCLOSURE

Aspects of the present disclosure generally relate to wireless communication and specifically, to techniques and apparatuses for power sharing for unused uplink occasions.

BACKGROUND

Wireless communication systems are widely deployed to provide various telecommunication services, such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP). As the demand for mobile broadband access continues to increase, further improvements in LTE, New Radio (NR), and other radio access technologies remain useful.

Power sharing may be implemented at a user equipment (UE) to balance power consumption between a master cell group (MCG) and a secondary cell group (SCG). In some examples, transmissions to an MCG may be prioritized over transmissions to an SCG (for example, a greater portion of an available transmit power may be reserved or allocated for uplink transmissions via the MCG). If transmissions to the MCG and SCG overlap in time and if the summation of transmit powers to the MCG and SCG would exceed an available transmit power for transmissions across the MCG and SCG (for example, an uplink transmit power limit of the UE), then the UE may reduce the transmit power to the SCG.

In some examples, the UE may use a semi-static power sharing technique to allocate transmit power for MCG transmissions and SCG transmission. For example, the UE may be associated with (for example, may be configured with) a first transmit power threshold for the MCG (for example, $P_{MCG}$) and a second transmit power threshold for the SCG (for example, $P_{SCG}$). The UE may be associated with a total transmit power limit (for example $P_{TOTAL}$). The total transmit power limit may also be referred to as an uplink transmit power budget. For the semi-static power sharing technique, the $P_{MCG}$ and the $P_{SCG}$ may be separately configured for the MCG and the SCG. A summation of the two threshold may be configured so as to not exceed the uplink transmit power limit of the UE. However, in some cases, the semi-static power sharing technique may result in an inefficient usage of the uplink transmit power budget of the UE. For example, if a transmit power of uplink transmission(s) via the SCG is less than the $P_{SCG}$, the total transmit power may always be less than the $P_{TOTAL}$ (for example, because a transmit power of uplink transmission(s) via the SCG may not exceed the $P_{SCG}$) Therefore, in some examples, the UE may use a dynamic transmit power sharing technique to share a transmit power between the MCG and the SCG. For example, the UE may prioritize MCG transmissions over SCG transmission. In some examples, the UE may determine a transmit power for uplink transmission(s) via the MCG. The UE may allocate a remaining transmit power (for example, from the $P_{TOTAL}$, to uplink transmission(s) via the SCG). Therefore, in some examples, a transmit power used for the SCG may be lower than a calculated transmit power for the SCG (for example, that is calculated using radio conditions of a link associated with the SCG), resulting in reduced performance and/or reliability of communications via the SCG.

SUMMARY

Some aspects described herein relate to an apparatus for wireless communication at a user equipment (UE). The apparatus may include one or more memories and one or more processors communicatively coupled with the one or more memories. At least one processor may be configured to cause the UE to receive an indication of an uplink occasion for a master cell group (MCG). At least one processor may be configured to cause the UE to transmit an indication that the uplink occasion is unused. At least one processor may be configured to cause the UE to transmit, via a secondary cell (SCG) and using a transmit power, a communication that at least partially overlaps with the uplink occasion in a time domain, the transmit power being including at least a portion of a reserved transmit power associated with the uplink occasion to the transmit power.

Some aspects described herein relate to an apparatus for wireless communication at a network node. The apparatus may include one or more memories one or more processors communicatively coupled with the one or more memories. At least one processor may be configured to cause the network node to transmit an indication of an uplink occasion for a UE and an MCG of the UE. At least one processor may be configured to cause the network node to receive an indication that the uplink occasion is unused by the UE. At least one processor may be configured to cause the network node to receive, via an SCG of the UE, a communication that at least partially overlaps with the uplink occasion in a time domain, a transmit power of the communication being associated with at least a portion of a reserved transmit power associated with the uplink occasion being allocated to the transmit power.

Some aspects described herein relate to a method of wireless communication performed at a UE. The method may include receiving an indication of an uplink occasion for an MCG. The method may include transmitting an indication that the uplink occasion is unused. The method may include transmitting, via an SCG and using a transmit power, a communication that at least partially overlaps with the uplink occasion in a time domain, the transmit power being associated with allocating at least a portion of a reserved transmit power associated with the uplink occasion to the transmit power.

Some aspects described herein relate to a method of wireless communication performed at a network node. The method may include transmitting an indication of an uplink occasion for a UE and an MCG of the UE. The method may include receiving an indication that the uplink occasion is unused by the UE. The method may include receiving, via an SCG of the UE, a communication that at least partially overlaps with the uplink occasion in a time domain, a transmit power of the communication being associated with at least a portion of a reserved transmit power associated with the uplink occasion being allocated to the transmit power.

Some aspects described herein relate to a non-transitory computer-readable medium that stores a set of instructions for wireless communication by a UE. The set of instructions, when executed by one or more processors of the UE, may cause the UE to receive an indication of an uplink occasion for an MCG. The set of instructions, when executed by one or more processors of the UE, may cause the UE to transmit an indication that the uplink occasion is unused. The set of instructions, when executed by one or more processors of the UE, may cause the UE to transmit, via an SCG and using a transmit power, a communication that at least partially overlaps with the uplink occasion in a time domain, the transmit power being associated with allocating at least a portion of a reserved transmit power associated with the uplink occasion to the transmit power.

Some aspects described herein relate to a non-transitory computer-readable medium that stores a set of instructions for wireless communication by a network node. The set of instructions, when executed by one or more processors of the network node, may cause the network node to transmit an indication of an uplink occasion for a UE and an MCG of the UE. The set of instructions, when executed by one or more processors of the network node, may cause the network node to receive an indication that the uplink occasion is unused by the UE. The set of instructions, when executed by one or more processors of the network node, may cause the network node to receive, via an SCG of the UE, a communication that at least partially overlaps with the uplink occasion in a time domain, a transmit power of the communication being associated with at least a portion of a reserved transmit power associated with the uplink occasion being allocated to the transmit power.

Some aspects described herein relate to an apparatus for wireless communication. The apparatus may include means for receiving an indication of an uplink occasion for an MCG. The apparatus may include means for transmitting an indication that the uplink occasion is unused. The apparatus may include means for transmitting, via an SCG and using a transmit power, a communication that at least partially overlaps with the uplink occasion in a time domain, the transmit power being associated with allocating at least a portion of a reserved transmit power associated with the uplink occasion to the transmit power.

Some aspects described herein relate to an apparatus for wireless communication. The apparatus may include means for transmitting an indication of an uplink occasion for a UE and an MCG of the UE. The apparatus may include means for receiving an indication that the uplink occasion is unused by the UE. The apparatus may include means for receiving, via an SCG of the UE, a communication that at least partially overlaps with the uplink occasion in a time domain, a transmit power of the communication being associated with at least a portion of a reserved transmit power associated with the uplink occasion being allocated to the transmit power.

Aspects generally include a method, apparatus, system, computer program product, non-transitory computer-readable medium, user equipment, base station, network node, network entity, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
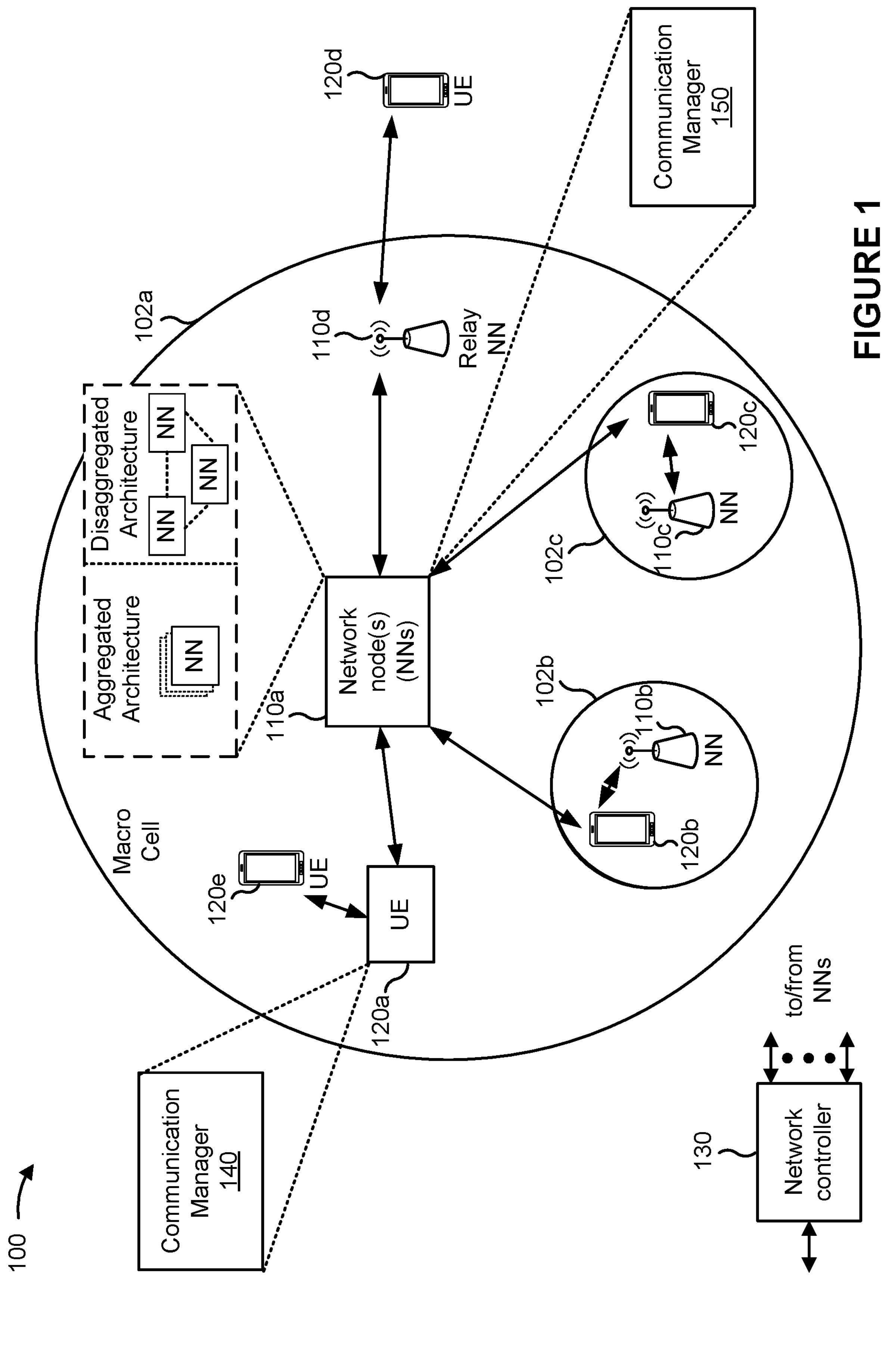
FIG. 1 is a diagram illustrating an example of a wireless network in accordance with the present disclosure.

Various aspects of the disclosure are described more fully hereinafter with reference to the accompanying drawings. This disclosure may, however, be embodied in many different forms and is not to be construed as limited to any specific structure or function presented throughout this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or combined with any other aspect of the disclosure. For example, an apparatus may be implemented, or a method may be practiced, using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

In some examples, a scheduled or configured uplink transmission may be cancelled or skipped. A cancelled or skipped uplink transmission via a master cell group (MCG) may impact the dynamic transmit power sharing between the MCG and a secondary cell group (SCG). For example, rather than allocating or reserving the transmit power for the MCG, a user equipment (UE) may be enabled to increase the transmit power of SCG transmissions by re-allocating the transmit power that would have otherwise been associated with the cancelled or skipped uplink transmission via the MCG. In some examples, the UE may indicate (for example, via an uplink control information (UCI) communication) that one or more uplink occasions (for example, scheduled or configured for the UE) are unused. However, the UE may still reserve a transmit power for the one or more uplink occasions (for example, even though the one or more uplink occasions are not actually used for any uplink transmissions). As a result, using dynamic transmit power sharing, a transmit power allocated for an uplink transmission via an SCG may be lower because of the reserve transmit power for the one or more unused uplink occasions.

For example, the UE may be unaware of an amount of time that a network node needs to receive and/or process the indication (for example, the UCI communication) of the unused uplink occasion. Further, the UE may be unaware of whether the network node successfully receives the indication (for example, the UCI communication) of the unused uplink occasion. Therefore, the UE may reserve a transmit power for the unused uplink occasion when performing dynamic transmit power sharing to ensure that the determined transmit power for the uplink transmission via the SCG is at a level that is expected by the network node. For example, using a higher than expected transmit power for the uplink transmission may result in issues (for example, processing and/or decoding issues) at the network node. Therefore, the UE may use a lower transmit power for the uplink transmission via the SCG, resulting in reduced performance of the uplink transmission and an inefficient use of the transmit power budget of the UE.

For example, for a UE in a dual connectivity mode, the total uplink transmission power of MCG and SCG may not exceed a maximum power limit (for example, the uplink transmit power budget). When a scheduled or configured uplink transmission is cancelled, the power unused for cancelled or skipped uplink transmission may be dynamically reallocated to the other cell group (for example, the SCG) if there is a concurrent SCG uplink transmission. However, the dynamic power sharing or reallocation is inefficient for future configured grant uplink occasion(s) that a UE does not plan to use.

Various aspects relate generally to power sharing for unused uplink occasions. Some aspects more specifically relate to adjusting dynamic transmit power sharing between an MCG and an SCG for an unused uplink occasion that is reported by a UE. For example, the UE may transmit an indication of the unused uplink occasion (for example, an uplink occasion associated with the MCG). The UE may transmit an uplink communication (for example, that at least partially overlaps in the time domain with the unused uplink occasion) using a transmit power that is determined using the adjusted dynamic transmit power sharing. In some aspects, the UE may allocate at least a portion of a reserved transmit power associated with the unused uplink occasion to the transmit power of the uplink communication that is transmitted via the SCG. In other words, for an unused uplink occasion (for example, that is indicated as being unused by the UE for the MCG), the UE may not reserve a transmit power for the unused uplink occasion when performing dynamic transmit power sharing between the MCG and the SCG. For example, for a transmit power determination of an uplink communication via the SCG, the UE may assume that the unused uplink occasion, associated with the MCG, is not present (for example, is not transmitted) based on, or otherwise associated with, transmitting the indication of the unused uplink occasion.

In some aspects, adjusting the dynamic transmit power sharing between the MCG and the SCG, for the uplink communication via the SCG, may be based on, or otherwise associated with, a timing of the uplink communication and a timing of the transmission of the indication of the unused uplink occasion. For example, for a transmit power determination of an uplink communication via the SCG, there may be a time deadline for adjusting the dynamic transmit power sharing between the MCG and the SCG. For example, if the UE transmits the indication of the unused uplink occasion an amount of time (for example, indicated by a value of a time offset parameter) before the time at which the uplink communication is to be transmitted in the SCG, then the UE may adjust the dynamic transmit power sharing between the MCG and the SCG for the transmit power determination of the uplink communication in the SCG, as described elsewhere herein. If the UE transmits the indication of the unused uplink occasion less than the amount of time (for example, indicated by the value of the time offset parameter) before the time at which the uplink communication is to be transmitted in the SCG, then the UE may not adjust the dynamic transmit power sharing between the MCG and the SCG for the transmit power determination of the uplink communication in the SCG (for example, in such cases, the UE may assume the unused uplink occasion is present in the MCG for transmit power determination of the uplink communication in the SCG).

For example, for a configured grant uplink occasion on MCG that UE indicates to be unused, the UE may assume no power on MCG is used for the configured grant uplink occasion when the UE determines the uplink transmit power for a SCG transmission that overlaps with the unused CG PUSCH occasion. To be in-sync between the UE and the network, a timeline may be defined from the indication of the unused configured grant uplink occasion to the application of the dynamic power reallocation.

Particular aspects of the subject matter described in this disclosure can be implemented to realize one or more of the following potential advantages. In some examples, the described techniques can be used to improve a performance of uplink communications in the SCG by enabling the uplink communications to have a higher transmit power (for example, when an overlapping uplink occasion in the MCG is unused by the UE). In some aspects, the described techniques can be used to remove an uncertainty as to whether the UE is to perform the adjustment of the dynamic power sharing between the MCG and the SCG by conditioning the adjustment on a timing of the uplink communication in the SCG and a timing of the transmission of the indication of the unused uplink occasion. This ensures that a network node has enough time to process the indication of the unused uplink occasion and identify that the UE is to perform the adjustment of the dynamic power sharing between the MCG and the SCG. As a result, the network node may accurately determine an expected transmit power of the uplink communication in the SCG, thereby improving a reception performance of the uplink communication.

FIG. 1 is a diagram illustrating an example of a wireless network in accordance with the present disclosure. The wireless network 100 may be or may include elements of a 5G (for example, NR) network or a 4G (for example, Long Term Evolution (LTE)) network, among other examples. The wireless network 100 may include one or more network nodes 110 (shown as a network node (NN) 110*a*, a network node 110*b*, a network node 110*c*, and a network node 110*d*), a UE 120 or multiple UEs 120 (shown as a UE 120*a*, a UE 120*b*, a UE 120*c*, a UE 120*d*, and a UE 120*e*), or other network entities. A network node 110 is an entity that communicates with UEs 120. As shown, a network node 110 may include one or more network nodes. For example, a network node 110 may be an aggregated network node, meaning that the aggregated network node is configured to utilize a radio protocol stack that is physically or logically integrated within a single RAN node (for example, within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, or one or more DUs. A network node 110 may include, for example, an NR network node, an LTE network node, a Node B, an eNB (for example, in 4G), a gNB (for example, in 5G), an access point, or a transmission reception point (TRP), a DU, an RU, a CU, a mobility element of a network, a core network node, a network element, a network equipment, and/or a RAN node. In some examples, the network nodes 110 may be interconnected to one another or to one or more other network nodes 110 in the wireless network 100 through various types of fronthaul, midhaul, or backhaul interfaces, such as a direct physical connection, an air interface, or a virtual network, using any suitable transport network.

Each network node 110 may provide communication coverage for a particular geographic area. In the Third Generation Partnership Project (3GPP), the term "cell" can refer to a coverage area of a network node 110 or a network node subsystem serving this coverage area, depending on the context in which the term is used.

A network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node.

The wireless network 100 may be a heterogeneous network that includes network nodes 110 of different types, such as macro network nodes, pico network nodes, femto network nodes, or relay network nodes. These different types of network nodes 110 may have different transmit power levels, different coverage areas, or different impacts on interference in the wireless network 100. For example, macro network nodes may have a high transmit power level (for example, 5 to 40 watts) whereas pico network nodes, femto network nodes, and relay network nodes may have lower transmit power levels (for example, 0.1 to 2 watts). In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (for example, three) cells. In some examples, a cell may not necessarily be stationary, and the geographic area of the cell may move according to the location of a network node 110 that is mobile (for example, a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), and/or a Non-Real Time (Non-RT) RIC. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

A network controller 130 may couple to or communicate with a set of network nodes 110 and may provide coordination and control for these network nodes 110. The network controller 130 may communicate with the network nodes 110 via a backhaul communication link The network nodes 110 may communicate with one another directly or indirectly via a wireless or wireline backhaul communication link. In some aspects, the network controller 130 may be a CU or a core network device, or the network controller 130 may include a CU or a core network device.

In some examples, a cell may not necessarily be stationary, and the geographic area of the cell may move in accordance with the location of a network node 110 that is mobile (for example, a mobile network node). In some examples, the network nodes 110 may be interconnected to one another or to one or more other network nodes 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (for example, a network node 110 or a UE 120) and send a transmission of the data to a downstream station (for example, a UE 120 or a network node 110). A relay station may be a UE 120 that can relay transmissions for other UEs 120. In the example shown in FIG. 1, the network node 110*d* (for example, a relay network node) may communicate with the network node 110*a* (for example, a macro network node) and the UE 120*d* in order to facilitate communication between the network node 110*a* and the UE 120*d*. A network node 110 that relays communications may be referred to as a relay station, a relay network node, or a relay.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, a UE function of a network node, or any other suitable device that is configured to communicate via a wireless medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a network node, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In some aspects, the UE 120 may include a communication manager 140. As described in more detail elsewhere herein, the communication manager 140 may receive an indication of an uplink occasion for an MCG; transmit an indication that the uplink occasion is unused; and transmit, via an SCG and using a transmit power, a communication that at least partially overlaps with the uplink occasion in a time domain, the transmit power being associated with allocating at least a portion of a reserved transmit power associated with the uplink occasion to the transmit power. Additionally or alternatively, the communication manager 140 may perform one or more other operations described herein.

In some aspects, the network node 110 may include a communication manager 150. As described in more detail elsewhere herein, the communication manager 150 may transmit an indication of an uplink occasion for a UE and an MCG of the UE; receive an indication that the uplink occasion is unused by the UE; and receive, via an SCG of the UE, a communication that at least partially overlaps with the uplink occasion in a time domain, a transmit power of the communication being associated with at least a portion of a reserved transmit power associated with the uplink occasion being allocated to the transmit power. Additionally or alternatively, the communication manager 150 may perform one or more other operations described herein.

Figure 2:
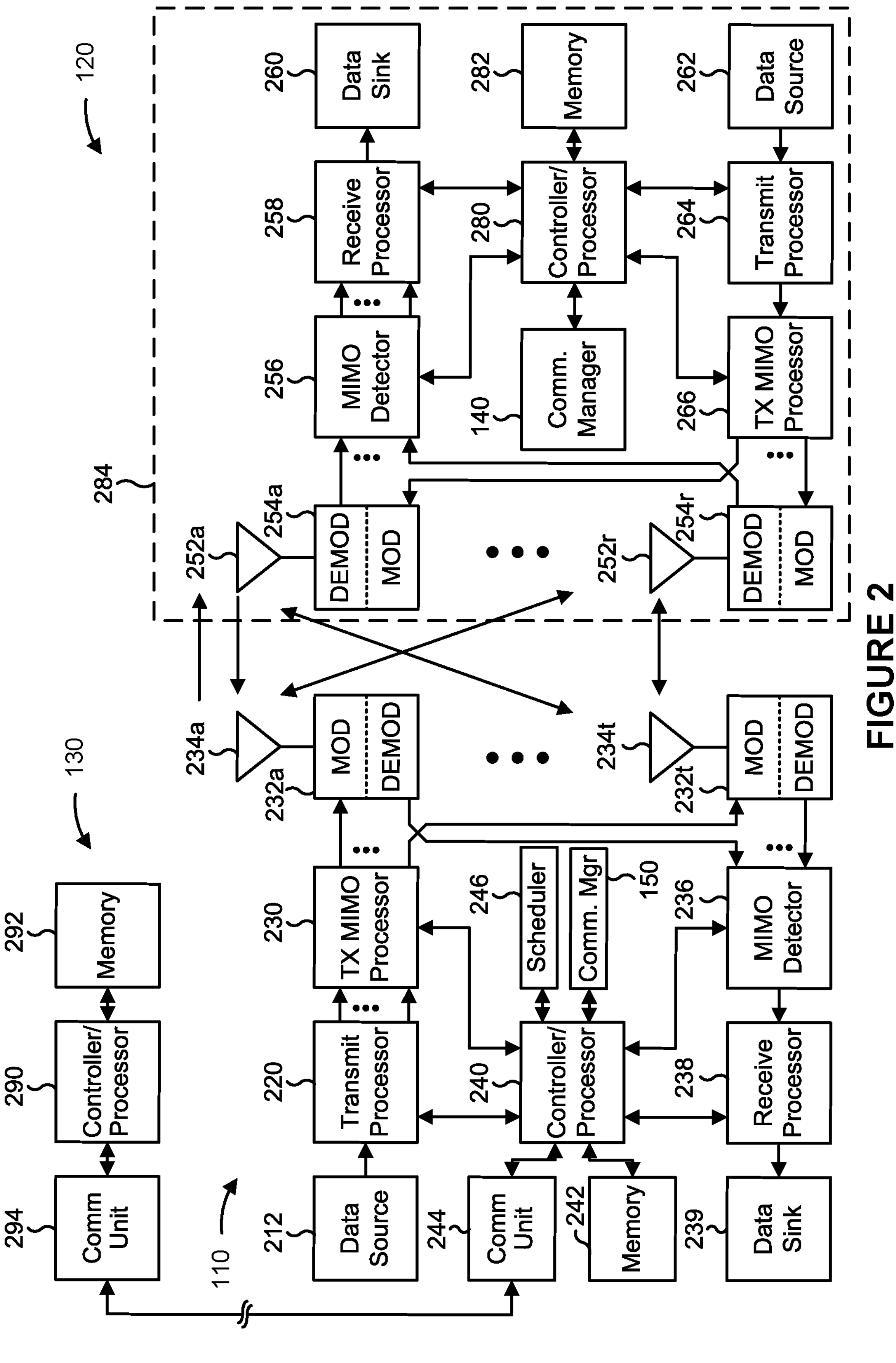
FIG. 2 is a diagram illustrating an example network node in communication with a user equipment (UE) in a wireless network in accordance with the present disclosure.

FIG. 2 is a diagram illustrating an example network node in communication with a UE in a wireless network in accordance with the present disclosure. The network node may correspond to the network node 110 of FIG. 1. Similarly, the UE may correspond to the UE 120 of FIG. 1. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of depicted in FIG. 2 includes one or more radio frequency components, such as antennas 234 and a modem 232. In some examples, a network node 110 may include an interface, a communication component, or another component that facilitates communication with the UE 120 or another network node.

Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (for example, encode and modulate) the data for the UE 120 based at least in part on the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232*a* through 232*t*. For example, each output symbol stream may be provided to a modulator component (shown as MOD) of a modem 232. Each modem 232 may use a respective modulator component to process a respective output symbol stream (for example, for orthogonal frequency-division multiplexing (OFDM)) to obtain an output sample stream. Each modem 232 may further use a respective modulator component to process (for example, convert to analog, amplify, filter, or upconvert) the output sample stream to obtain a downlink signal. The modems 232*a* through 232*t* may transmit a set of downlink signals (for example, T downlink signals) via a corresponding set of antennas 234 (for example, T antennas), shown as antennas 234*a* through 234*t*.

At the UE 120, a set of antennas 252 (shown as antennas 252*a* through 252*r*) may receive the downlink signals from the network node 110 or other network nodes 110 and may provide a set of received signals (for example, R received signals) to a set of modems 254 (for example, R modems), shown as modems 254*a* through 254*r*. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers and/or one or more processors. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (for example, antennas 234*a* through 234*t* or antennas 252*a* through 252*r*) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the methods described herein.

At the network node 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the methods described herein.

The controller/processor 240 of the network node 110, the controller/processor 280 of the UE 120, or any other component(s) of FIG. 2 may perform one or more techniques associated with power sharing for unused uplink occasions, as described in more detail elsewhere herein. For example, the controller/processor 240 of the network node 110, the controller/processor 280 of the UE 120, or any other component(s) of FIG. 2 may perform or direct operations of, for example, process 800 of FIG. 8, process 900 of FIG. 9, or other processes as described herein. The memory 242 and the memory 282 may store data and program codes for the network node 110 and the UE 120, respectively. In some examples, the memory 242 or the memory 282 may include a non-transitory computer-readable medium storing one or more instructions (for example, code or program code) for wireless communication. For example, the one or more instructions, when executed (for example, directly, or after compiling, converting, or interpreting) by one or more processors of the network node 110 or the UE 120, may cause the one or more processors, the UE 120, or the network node 110 to perform or direct operations of, for example, process 800 of FIG. 8, process 900 of FIG. 9, or other processes as described herein. In some examples, executing instructions may include running the instructions, converting the instructions, compiling the instructions, or interpreting the instructions, among other examples.

In some aspects, the UE 120 includes means for receiving an indication of an uplink occasion for an MCG; means for transmitting an indication that the uplink occasion is unused; and/or means for transmitting, via an SCG and using a transmit power, a communication that at least partially overlaps with the uplink occasion in a time domain, the transmit power being associated with allocating at least a portion of a reserved transmit power associated with the uplink occasion to the transmit power. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for transmitting an indication of an uplink occasion for a UE and an MCG of the UE; means for receiving an indication that the uplink occasion is unused by the UE; and/or means for receiving, via an SCG of the UE, a communication that at least partially overlaps with the uplink occasion in a time domain, a transmit power of the communication being associated with at least a portion of a reserved transmit power associated with the uplink occasion being allocated to the transmit power. The means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, actions described herein as being performed by a network node 110 may be performed by multiple different network nodes. For example, configuration actions may be performed by a first network node (for example, a CU or a DU), and radio communication actions may be performed by a second network node (for example, a DU or an RU).

As used herein, the network node 110 "outputting" or "transmitting" a communication to the UE 120 may refer to a direct transmission (for example, from the network node 110 to the UE 120) or an indirect transmission via one or more other network nodes or devices. For example, if the network node 110 is a DU, an indirect transmission to the UE 120 may include the DU outputting or transmitting a communication to an RU and the RU transmitting the communication to the UE 120, or may include causing the RU to transmit the communication (for example, triggering transmission of a physical layer reference signal). Similarly, the UE 120 "transmitting" a communication to the network node 110 may refer to a direct transmission (for example, from the UE 120 to the network node 110) or an indirect transmission via one or more other network nodes or devices. For example, if the network node 110 is a DU, an indirect transmission to the network node 110 may include the UE 120 transmitting a communication to an RU and the RU transmitting the communication to the DU. Similarly, the network node 110 "obtaining" a communication may refer to receiving a transmission carrying the communication directly (for example, from the UE 120 to the network node 110) or receiving the communication (or information derived from reception of the communication) via one or more other network nodes or devices.

Figure 3:
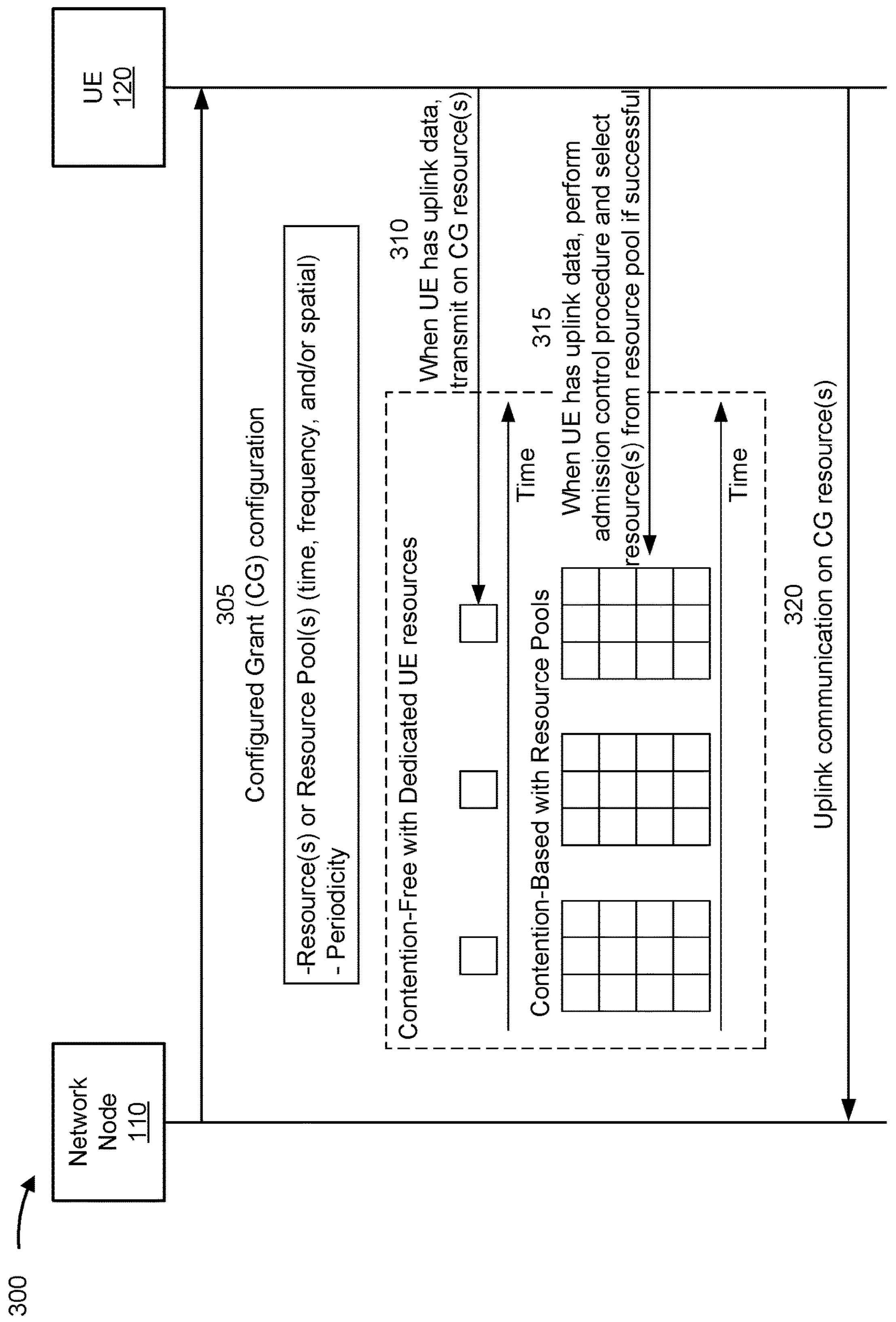
FIG. 3 is a diagram illustrating an example of configured grant communications in accordance with the present disclosure.

FIG. 3 is a diagram illustrating an example of configured grant (CG) communications 300, in accordance with the present disclosure. As shown, a network node (for example, a network node 110) may communicate with a UE (for example, a UE 120).

As shown in FIG. 3, and in a first operation 305, the network node 110 may transmit, and the UE 120 may receive, a CG configuration. For example, the network node 110 may transmit configuration information (for example, in a radio resource control (RRC) message, in a downlink control information message, and/or in another signaling message) that identifies the CG. In some examples, the configuration information identifying the CG may indicate a resource allocation (for example, in a time domain, frequency domain, spatial domain, and/or code domain) and/or a periodicity associated with the resource allocation. The resource allocation may be referred to herein as an "occasion" (for example, a CG occasion or a periodic uplink occasion). "Occasion" and "transmission occasion" may be used interchangeably. For example, an occasion may be associated with the resource allocation that is available for the UE 120 to use for an uplink communication. The CG may identify a resource or set of resources available to the UE 120 for transmission of an uplink communication (for example, data and/or control information). For example, the CG configuration may identify a resource allocation for a PUSCH (for example, the resource allocation may be a PUSCH occasion). In some examples, the CG configuration may identify a resource pool or multiple resource pools that may be available to the UE 120 for an uplink transmission.

In some examples, the CG configuration may configure contention-free CG communication with resources dedicated for the UE 120 to transmit uplink communications. In this case, the CG configuration may indicate a resource allocation (for example, in a time domain, frequency domain, spatial domain, and/or code domain) dedicated for the UE 120 to use to transmit uplink communications. In some examples, the CG configuration may configure the resource allocation for the UE 120 to occur periodically, such that the resource allocation corresponds to periodically occurring transmission time occasions. As shown in FIG. 3, and in a second operation 310, when the UE 120 has uplink data to transmit, the UE 120 transmits the uplink data in the CG resources identified by the CG configuration. For example, the UE 120 transmits the uplink data in one of the CG uplink occasions identified in the CG configuration using the configured resource allocation.

In some examples, the CG configuration may configure a period (for example, a CG period) that is associated with multiple resource allocations and/or multiple CG occasions. In some examples, the period may be referred to as a CG occasion with multiple PUSCH occasions. For example, a single CG configuration may configure multiple resource allocations and/or multiple CG occasions that are associated with the same CG period. For example, for periodic uplink traffic with variable data burst size, multiple occasions configured for a period can be useful for a UE. For example, a UE 120 that is relatively stationary (for example, not moving) may use all or a subset of the occasions configured for the period (for example, for data transmissions). For example, a period (for example, a CG period) that is associated with multiple resource allocations and/or multiple CG occasions may be useful for extended reality (XR) applications and/or traffic.

In some examples, multiple opportunities for the UE 120 to transmit the uplink communication may be defined within a CG uplink occasion. The UE 120 may be configured with multiple CG uplinks to allow the UE 120 to repeatedly transmit the CG uplink communications and increase the likelihood that the network node 110 receives the communications. NR CG uplink may depend on dynamic grant re-transmission. In some examples, to suppress a quantity of dynamic grants, the CG can be configured with blind re-transmissions via multiple repetitions per occasion.

In some cases, CG configurations with dedicated resources allocated per UE 120 may be inefficient. For example, CG configurations with dedicated UE 120 resources for a large number of UEs may result in consumption of an excessive amount of PUSCH resources. In this case, a considerable portion of the PUSCH resources may be inefficiently utilized, which reduces system capacity. For example, when multiple CG configurations for a UE 120 are used for de-jittering, only a subset of CG resources may be effectively utilized. In another example, when multiple transmission opportunities are defined per CG uplink occasion, only one opportunity may be effectively utilized. In yet another example, when a blind repetition scheme is used for re-transmissions, a packet may have been already decoded after the first one or more repetitions (early decoding) such that a remainder of the repetitions are unnecessary. Unlike a downlink case, this type of inefficient consumption of system resources cannot be addressed by scheduling, as the network node 110 does not know exactly when traffic will arrive at the UEs.

CGs may include Type 1 CGs or Type 2 CGs. For Type 1 CGs, a CG configuration (for example, an RRC configuration) may configure configured uplink grant (including the periodicity). For Type 2 CGs, the CG configuration (for example, an RRC configuration) may define the periodicity of the configured uplink grant while downlink control information (DCI) can signal and/or activate the configured uplink grant. For example, the network node 110 may transmit CG activation DCI to the UE 120 to activate the CG configuration for the UE 120 (for example, for Type 2 CGs). The network node 110 may indicate, in the CG activation DCI, communication parameters, such as an MCS, a resource block (RB) allocation, and/or antenna ports, for the CG PUSCH communications to be transmitted in the scheduled CG occasions. The UE 120 may begin transmitting in the CG occasions based at least in part on receiving the CG activation DCI. For example, beginning with a next scheduled CG occasion subsequent to receiving the CG activation DCI, the UE 120 may transmit a PUSCH communication in the scheduled CG occasions using the communication parameters indicated in the CG activation DCI. The UE 120 may refrain from transmitting in configured CG occasions prior to receiving the CG activation DCI.

As shown in FIG. 3, the CG configuration may configure contention-based CG communication with resource pools that are available for multiple UEs to use to transmit uplink communications. The contention-based CG configuration uses statistical multiplexing to share the resource pools among multiple UEs. A resource pool includes multiple resources (for example, in a time domain, frequency domain, spatial domain, and/or code domain) that can be allocated for uplink transmission for one or more UEs. For example, a horizontal axis of an illustrated resource pool may indicate transmission times and a vertical axis of the illustrated resource pool may indicate resources (for example, frequency domain, spatial domain, and/or code domain) that can be allocated at each transmission time. In some examples, the same resource pools may be configured for multiple UEs.

As further shown in FIG. 3, and in a third operation 315, for the contention-based CG configuration, when the UE 120 has uplink data to be transmitted, the UE 120 performs an admission control procedure and selects one or more resources from the resource pool if the admission control procedure is successful. In some examples, the admission control procedure may include the UE 120 selecting a random number (for example, between 0 and 1 or some other range), comparing the random number and a threshold, and determining whether the random number satisfies the threshold. If the random number satisfies the threshold, then the admission is successful and the UE 120 selects a resource from the resource pool to transmit the uplink communication.

As further shown in FIG. 3, and in a fourth operation 320, the UE 120 may transmit the uplink communication to the network node 110 on the CG resource. For example, the UE 120 may transmit the uplink communication as a PUSCH communication using a resource allocation identified by the CG.

Figure 4:
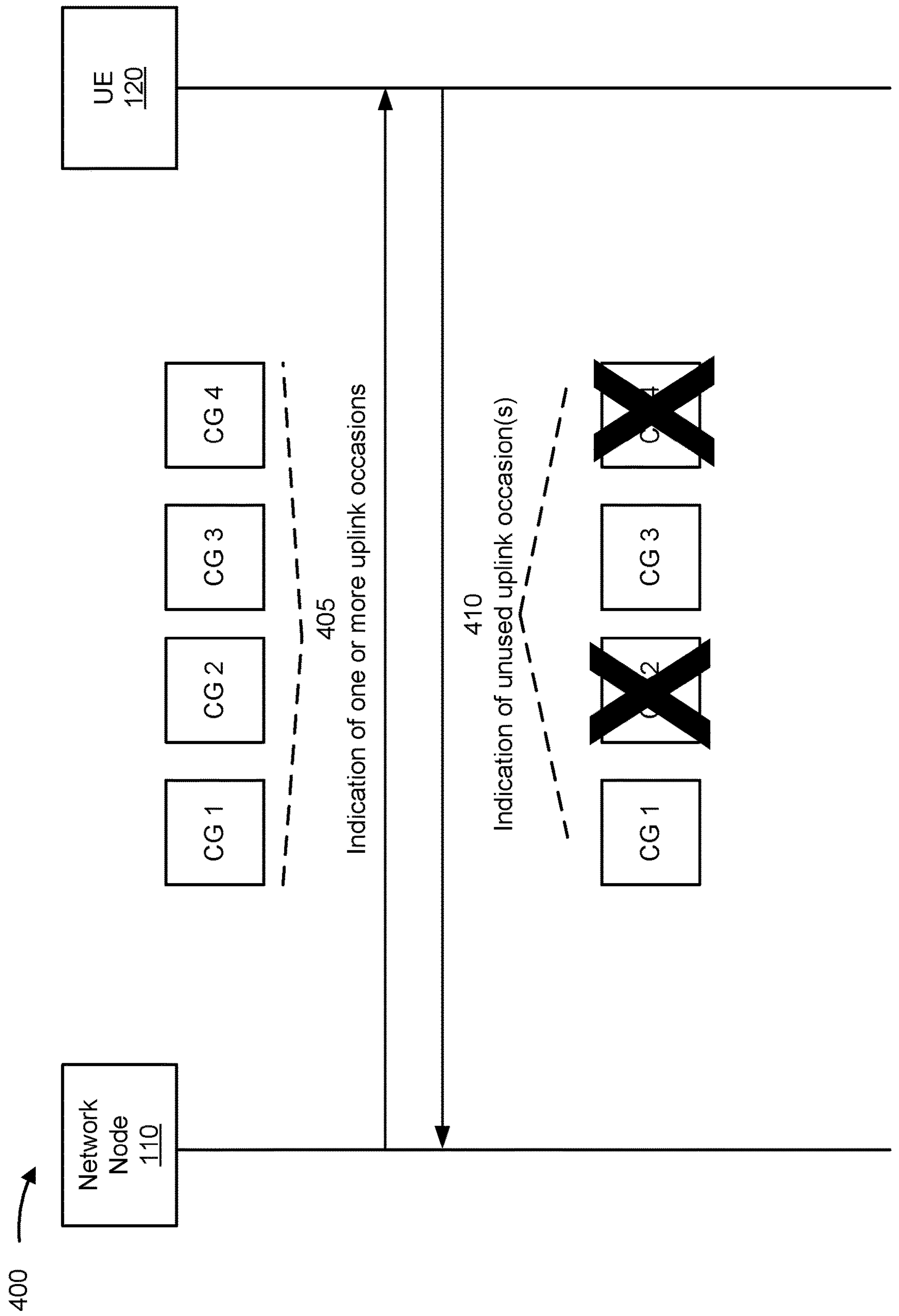
FIG. 4 is a diagram illustrating an example of uplink occasion skipping in accordance with the present disclosure.

FIG. 4 is a diagram illustrating an example of uplink occasion skipping 400 in accordance with the present disclosure. As shown, a network node (for example, a network node 110) may communicate with a UE (for example, a UE 120).

In a first operation 405, the network node 110 may transmit, and the UE 120 may receive, an indication of one or more uplink occasions. The one or more uplink occasions may be CG occasions. In some other examples, the one or more uplink occasions may be dynamic grant occasions (for example, scheduled via DCI). For example, the network node 110 may transmit scheduling information (for example, in an RRC communication, in DCI, and/or in another signaling communication) that identifies radio resources associated with the one or more uplink occasions. In some examples, the one or more uplink occasions may be associated with a CG period associated with multiple CG (or PUSCH) occasions. In some examples, the scheduling information identifying the one or more uplink occasions may indicate resource allocations (for example, in a time domain, frequency domain, spatial domain, and/or code domain) associated with respective uplink occasions or PUSCH occasions and/or a periodicity associated with the uplink occasions or PUSCH occasions. The uplink occasions (shown as CG 1, CG 2, CG 3, and CG 4 in FIG. 4 as an example) may identify a resource or set of resources available to the UE 120 for transmission of an uplink communication (for example, data and/or control information). For example, the scheduling information may identify resource allocations for a PUSCH.

In a second operation 410, the UE 120 may transmit, and the network node 110 may receive, an indication of one or more unused uplink occasions from the one or more scheduled or configured uplink occasions (for example, scheduled or configured in the first operation 405). As used herein, an "unused" occasion (for example, an unused CG occasion, an unused PUSCH occasion, and/or an unused uplink occasion) may refer to an occasion that is configured or scheduled for the UE 120 (for example, via an RRC configuration, a CG configuration, DCI, and/or other scheduling information) and that is indicated as not to be used for an uplink communication by the UE 120 (for example, via signaling between the UE 120 and the network node 110). An unused occasion may also be referred to as a skipped occasion. In other words, an unused occasion may not be an occasion that is indicated (by the UE) as being skipped or unused by the UE 120 (for example, and being intended to be skipped or unused by the UE). For example, the UE 120 may support transmitting a dynamic indication of unused uplink occasion(s) based on, or otherwise associated with, uplink control information (UCI) (for example, CG-UCI or another type of UCI). For example, the indication of one or more unused uplink occasions may be included in a UCI communication (for example, that is transmitted via a physical uplink control channel (PUCCH) or a PUSCH). The UCI communication may be an unused transmission occasion (UTO) UCI (UTO-UCI) communication.

For example, as shown in FIG. 4, the indication of the one or more unused uplink occasions may indicate that the CG 2 and the CG 4 are unused or skipped by the UE. For example, at a given time, the UE 120 may determine that there is no data in a transmission buffer of the UE 120 that is to be transmitted using the one or more uplink occasions (for example, the CG 2, and the CG 4) for a given occurrence of the uplink occasion(s). Therefore, the UE 120 may indicate that the one or more uplink occasions will be unused by the UE 120 for uplink communications.

The indication of the one or more unused uplink occasions improves performance of the network node 110 and/or overall network performance. For example, the network node 110 may conserve resources (for example, processing resources, computing resources, and/or other resources) that would have otherwise been used monitoring for and/or attempting to detect (for example, via a blind detection technique) uplink communications that are transmitted via the one or more unused uplink occasions. Additionally, the network node 110 (or another network node) may be enabled to use resources (for example, time domain resources, frequency domain resources, and/or spatial domain resources) associated with the one or more unused uplink occasions for other purposes (for example, for other UEs or other communications). This improves an efficiency and resource utilization of the wireless network, thereby improving overall network performance.

Figure 5:
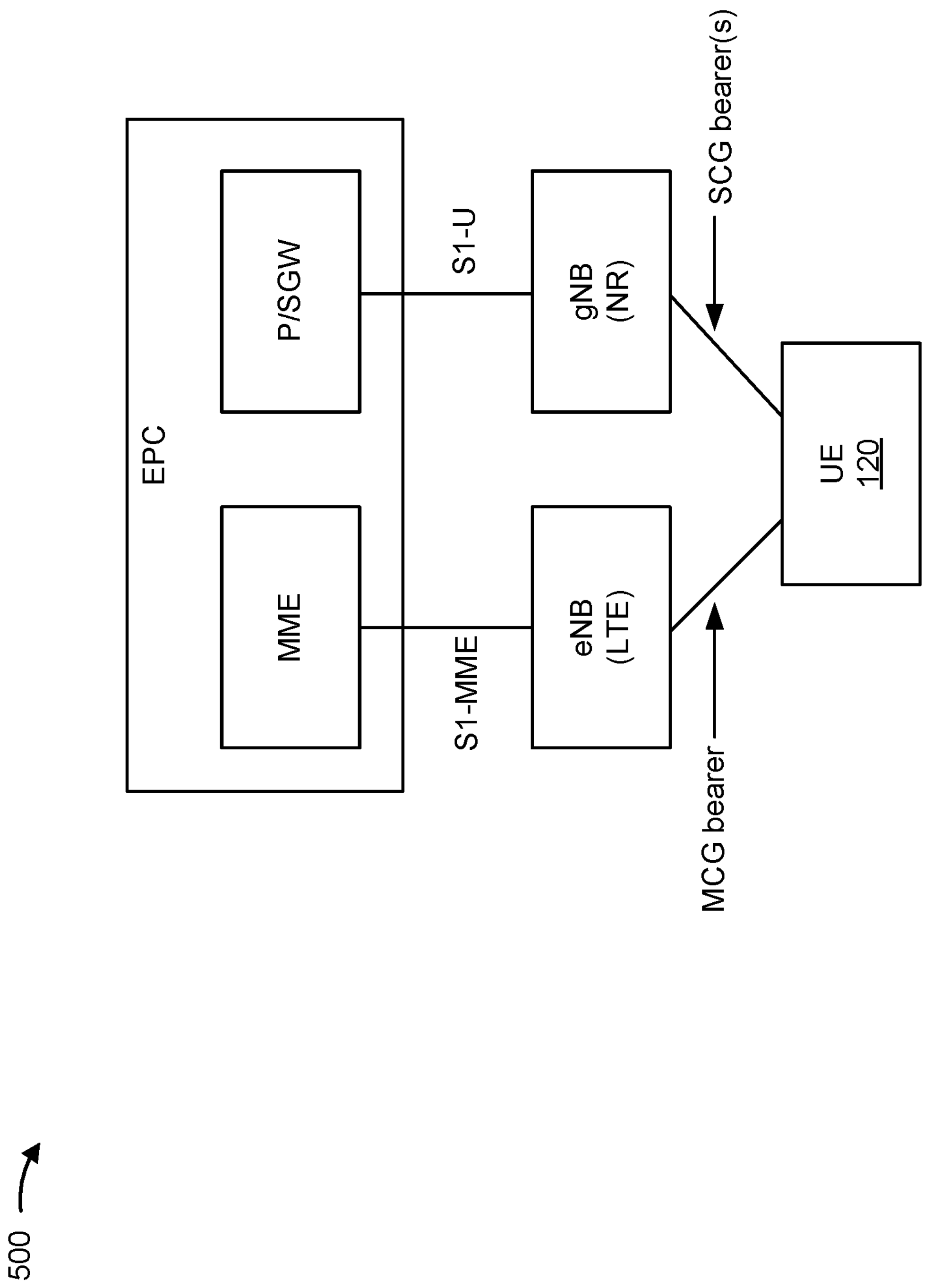
FIG. 5 is a diagram illustrating an example of dual connectivity in accordance with the present disclosure.

FIG. 5 is a diagram illustrating an example of dual connectivity 500 in accordance with the present disclosure. The example shown in FIG. 5 is for an Evolved Universal Mobile Telecommunications System Terrestrial Radio Access (E-UTRA)-NR dual connectivity (ENDC) mode. In the ENDC mode, a UE 120 communicates using an LTE RAT on an MCG, and the UE 120 communicates using an NR RAT on an SCG. However, aspects described herein may apply to an ENDC mode (for example, where the MCG is associated with an LTE RAT and the SCG is associated with an NR RAT), an NR-E-UTRA dual connectivity (NEDC) mode (for example, where the MCG is associated with an NR RAT and the SCG is associated with an LTE RAT), an NR dual connectivity (NRDC) mode (for example, where the MCG is associated with an NR RAT and the SCG is also associated with the NR RAT), or another dual connectivity mode (for example, where the MCG is associated with a first RAT and the SCG is associated with one of the first RAT or a second RAT). The ENDC mode is sometimes referred to as an NR or 5G non-standalone (NSA) mode. Thus, as used herein, "dual connectivity mode" may refer to an ENDC mode, an NEDC mode, an NRDC mode, and/or another type of dual connectivity mode.

As shown in FIG. 5, a UE 120 may communicate with both an eNB (for example, a 4G network node 110) and a gNB (for example, a 5G network node 110), and the eNB and the gNB may communicate (for example, directly or indirectly) with a 4G/LTE core network, shown as an evolved packet core (EPC) that includes a mobility management entity (MME), a packet data network gateway (PGW), a serving gateway (SGW), and/or other devices. In FIG. 5, the PGW and the SGW are shown collectively as P/SGW. In some examples, the eNB and the gNB may be co-located at the same network node 110. In some examples, the eNB and the gNB may be included in different network nodes 110 (for example, may not be co-located).

As further shown in FIG. 5, in some examples, a wireless network that permits operation in a 5G NSA mode may permit such operations using an MCG for a first RAT (for example, an LTE RAT or a 4G RAT) and an SCG for a second RAT (for example, an NR RAT or a 5G RAT). In this case, the UE 120 may communicate with the eNB via the MCG, and may communicate with the gNB via the SCG. In some examples, the MCG may anchor a network connection between the UE 120 and the 4G/LTE core network (for example, for mobility, coverage, and/or control plane information), and the SCG may be added as additional carriers to increase throughput (for example, for data traffic and/or user plane information). For example, an MCG may be associated with (for example, provided by) a primary node, and an SCG may be associated with a secondary node. The primary node may be referred to as an anchor node. The UE 120 may perform initial registration to an anchor node (or an MCG associated with the anchor node). The anchor node may add one or more secondary cells to an SCG of the UE. Thus, the MCG, provided by the primary node, may function as the controlling entity and may utilize an SCG to provide additional data capacity.

In some examples, the gNB and the eNB may not transfer user plane information between one another. In some examples, a UE 120 operating in a dual connectivity mode may be concurrently connected with an LTE network node 110 (for example, an eNB) and an NR network node 110 (for example, a gNB) (for example, in the case of ENDC or NEDC), or may be concurrently connected with one or more network nodes 110 that use the same RAT (for example, in the case of NRDC). In some examples, the MCG may be associated with a first frequency band (for example, a sub-6 GHz band and/or an FR1 band) and the SCG may be associated with a second frequency band (for example, a millimeter wave band and/or an FR2 band).

The UE 120 may communicate via the MCG and the SCG using one or more radio bearers (for example, data radio bearers (DRBs) and/or signaling radio bearers (SRBs)). For example, the UE 120 may transmit or receive data via the MCG and/or the SCG using one or more DRBs. Similarly, the UE 120 may transmit or receive control information (for example, RRC information and/or measurement reports) using one or more SRBs. In some examples, a radio bearer may be dedicated to a specific cell group (for example, a radio bearer may be an MCG bearer or an SCG bearer). In some examples, a radio bearer may be a split radio bearer. A split radio bearer may be split in the uplink and/or in the downlink. For example, a DRB may be split on the downlink (for example, the UE 120 may receive downlink information for the MCG or the SCG in the DRB) but not on the uplink (for example, the uplink may be non-split with a primary path to the MCG or the SCG, such that the UE 120 transmits in the uplink only on the primary path). In some examples, a DRB may be split on the uplink with a primary path to the MCG or the SCG. A DRB that is split in the uplink may transmit data using the primary path until a size of an uplink transmit buffer satisfies an uplink data split threshold. If the uplink transmit buffer satisfies the uplink data split threshold, the UE 120 may transmit data to the MCG or the SCG using the DRB.

Power sharing may be implemented to balance power consumption between an MCG and an SCG. In some examples, transmissions to an MCG may be prioritized over transmissions to an SCG (for example, a greater portion of an available transmit power may be reserved or allocated for uplink transmissions via the MCG). If transmissions to the MCG and SCG overlap in time and if the summation of transmit powers to the MCG and SCG would exceed the maximum available transmit power for transmissions across the MCG and SCG, then the UE 120 may reduce the transmit power to the SCG.

In some examples, the UE 120 may use a semi-static power sharing technique to allocate transmit power for MCG transmissions and SCG transmissions. For example, the UE 120 may be associated with (for example, may be configured with) a first transmit power threshold for the MCG (for example, $P_{MCG}$) and a second transmit power threshold for the SCG (for example, $P_{SCG}$) The UE 120 may be associated with a total transmit power limit (for example $P_{TOTAL}$). The total transmit power limit may also be referred to as an uplink transmit power budget. For the semi-static power sharing technique, the $P_{MCG}$ and the $P_{SCG}$ may be separately configured for the MCG and the SCG. A summation of the two threshold may be configured so as to not exceed the total transmit power limit. In other words, the UE 120 may expect that a sum of the $P_{MCG}$ and the $P_{SCG}$ is less than or equal to the $P_{TOTAL}$ (for example, $P_{MCG}+P_{SCG}\leq P_{TOTAL}$). The UE 120 may scale (for example, reduce) a transmit power of a given transmission if a determined transmit power for the given transmission exceeds a transmit power threshold for a cell group (or a carrier and/or frequency band) associated with the given transmission. For example, if the UE 120 determines that (for example, based on, or otherwise associated with, a pathloss of a link, an RSRP of the link, or other radio conditions of the link) an uplink transmission via the MCG is to have a transmit power that is greater than the $P_{MCG}$, then the UE 120 may scale or reduce the transmit power to be less than or equal to the $P_{MCG}$. Similarly, if the UE 120 determines that (for example, based on, or otherwise associated with, a pathloss of a link, an RSRP of the link, or other radio conditions of the link) an uplink transmission via the SCG is to have a transmit power that is greater than the $P_{SCG}$, then the UE 120 may scale or reduce the transmit power to be less than or equal to the $P_{SCG}$. In other words, the UE 120 may perform transmit power scaling and/or determinations separately for the MCG and the SCG. This ensures that a sum of a transmit power for the MCG and the SCG does not exceed the total transmit power limit associated with the UE 120. However, in some cases, the semi-static power sharing technique may result in an inefficient usage of the uplink transmit power budget of the UE 120. For example, if a transmit power of uplink transmission(s) via the SCG is less than the $P_{SCG}$, the total transmit power may always be less than the $P_{TOTAL}$ (for example, because a transmit power of uplink transmission(s) via the SCG may not exceed the $P_{SCG}$).

Therefore, in some examples, the UE 120 may use a dynamic transmit power sharing technique to share a transmit power between the MCG and the SCG. For example, the UE 120 may prioritize MCG transmissions over SCG transmission. In some examples, the UE 120 may determine a transmit power for uplink transmission(s) via the MCG (for example, based on, or otherwise associated with, a pathloss of a link associated with the MCG, an RSRP of the link, or other radio conditions of the link) The UE 120 may allocate a remaining transmit power (for example, from the $P_{TOTAL}$, to uplink transmission(s) via the SCG). For example, the UE 120 may determine that a transmit power for the uplink transmission(s) via the MCG is $T_{MCG}$. The UE 120 may determine that an available transmit power for the uplink transmission(s) via the SCG is $P_{TOTAL}$-$T_{MCG}$. This ensures that the total uplink transmit power budget is available for use by the UE 120. Additionally, the dynamic transit power sharing improves a performance of uplink communications via the MCG by ensuring that the transmit power of the uplink transmissions is not scaled or reduced.

In some examples, a scheduled or configured uplink transmission may be cancelled or skipped. For example, the UE 120 may determine that an uplink occasion is to be skipped based on, or otherwise associated with, determining that the UE 120 has no uplink data to transmit. As another example, the UE 120 may determine that an uplink occasion is to be skipped based on, or otherwise associated with, receiving DCI from the network node 110 indicating that the uplink occasion is to be skipped or cancelled. For example, the DCI may be a slot format indication DCI (for example, associated with a DCI format 2_0) that indicates a slot or OFDM symbol in which the uplink occasion is scheduled or configured to occur in is no longer associated with uplink communications (for example, the DCI may indicate that the slot or OFDM symbol in which the uplink occasion is scheduled or configured to occur in is to be changed to a downlink slot or symbol). Therefore, the UE 120 may determine that the uplink occasion is to be skipped or cancelled. As another example, the DCI may include uplink cancellation indication (for example, associated with a DCI format 2_4). The uplink cancellation indication may indicate that the uplink occasion is to be skipped or cancelled by the UE 120.

A cancelled or skipped uplink transmission via the MCG may impact the dynamic transmit power sharing between the MCG and the SCG. For example, the UE 120 rather than allocating or reserving the transmit power for the MCG, the UE 120 may be enabled to increase the transmit power of SCG transmissions by re-allocating the transmit power that would have otherwise been associated with the cancelled or skipped uplink transmission via the MCG. However, there may be a deadline associated with adjusting the dynamic transmit power sharing between the MCG and SCG for MCG uplink occasions that are cancelled in response to receiving DCI (for example, associated with DCI format 2_0 and/or DCI format 2_4). For example, the deadline may be associated with an amount of time for the UE 120 to process the DCI. As an example, for uplink transmit power determination for an uplink transmission via the SCG that starts at a time T0, the UE 120 may assume that an uplink transmission via the MCG is present for transmit power determination purposes (for example, even if the uplink transmission is not actually transmitted) if the uplink transmission via the MCG is cancelled in response to receiving a DCI communication that is received by the UE 120 after a time indicated by T0-$T_{offset}$. $T_{offset}$ may be a capability of the UE 120 that is transmitted to the network node 110 via UE capability signaling. For example, the $T_{offset}$ may be associated with a processing capability of the UE 120 (for example, an amount of time associated with the UE 120 processing DCI). If DCI communication that is received by the UE 120 before a time indicated by T0-$T_{offset}$, then the UE 120 may perform dynamic transmit power sharing by allocating or reserving no transmit power for the uplink transmission via the MCG. This enables the UE 120 to allocate more transmit power to an uplink transmission via the SCG that at least partially overlaps in the time domain with the cancelled or skipped uplink transmission via the MCG, thereby improving a performance of the uplink transmission via the SCG.

As described elsewhere herein, the UE 120 may indicate (for example, via a UCI communication) that one or more uplink occasions (for example, scheduled or configured for the UE 120) are unused. For example, the UE 120 may indicate that an uplink communication, scheduled or configured for the MCG, is unused. However, the UE 120 may still reserve a transmit power for the one or more uplink occasions (for example, even though the one or more uplink occasions are not actually used for any uplink transmissions). As a result, using dynamic transmit power sharing, a transmit power allocated for an uplink transmission via an SCG may be lower because of the reserve transmit power for the one or more unused uplink occasions.

For example, the UE 120 may be unaware of an amount of time that a network node 110 needs to receive and/or process the indication (for example, the UCI communication) of the unused uplink occasion. Further, the UE 120 may be unaware of whether the network node 110 successfully receives the indication (for example, the UCI communication) of the unused uplink occasion. Therefore, the UE 120 may reserve a transmit power for the unused uplink occasion when performing dynamic transmit power sharing to ensure that the determined transmit power for the uplink transmission via the SCG is at a level that is expected by the network node 110. For example, using a higher than expected transmit power for the uplink transmission may result in issues (for example, processing and/or decoding issues) at the network node 110. Therefore, the UE 120 may use a lower transmit power for the uplink transmission via the SCG, resulting in reduced performance of the uplink transmission and an inefficient use of the transmit power budget of the UE 120.

Various aspects relate generally to power sharing for unused uplink occasions. Some aspects more specifically relate to adjusting dynamic transmit power sharing between an MCG and an SCG for an unused uplink occasion that is reported by a UE. For example, the UE may transmit an indication of the unused uplink occasion (for example, an uplink occasion associated with the MCG). The UE may transmit an uplink communication (for example, that at least partially overlaps in the time domain with the unused uplink occasion) using a transmit power that is determined using the adjusted dynamic transmit power sharing. In some aspects, the UE may allocate at least a portion of a reserved transmit power associated with the unused uplink occasion to the transmit power of the uplink communication that is transmitted via the SCG. In other words, for an unused uplink occasion (for example, that is indicated as being unused by the UE for the MCG), the UE may not reserve a transmit power for the unused uplink occasion when performing dynamic transmit power sharing between the MCG and the SCG. For example, for a transmit power determination of an uplink communication via the SCG, the UE may assume that the unused uplink occasion, associated with the MCG, is not present (for example, is not transmitted) based on, or otherwise associated with, transmitting the indication of the unused uplink occasion.

In some aspects, adjusting the dynamic transmit power sharing between the MCG and the SCG, for the uplink communication via the SCG, may be based on, or otherwise associated with, a timing of the uplink communication and a timing of the transmission of the indication of the unused uplink occasion. For example, for a transmit power determination of an uplink communication via the SCG, there may be a time deadline for adjusting the dynamic transmit power sharing between the MCG and the SCG. For example, if the UE transmits the indication of the unused uplink occasion an amount of time (for example, indicated by a value of a time offset parameter) before the time at which the uplink communication is to be transmitted in the SCG, then the UE may adjust the dynamic transmit power sharing between the MCG and the SCG for the transmit power determination of the uplink communication in the SCG, as described elsewhere herein. If the UE transmits the indication of the unused uplink occasion less than the amount of time (for example, indicated by the value of the time offset parameter) before the time at which the uplink communication is to be transmitted in the SCG, then the UE may not adjust the dynamic transmit power sharing between the MCG and the SCG for the transmit power determination of the uplink communication in the SCG (for example, in such cases, the UE may assume the unused uplink occasion is present in the MCG for transmit power determination of the uplink communication in the SCG).

Particular aspects of the subject matter described in this disclosure can be implemented to realize one or more of the following potential advantages. In some examples, the described techniques can be used to improve a performance of uplink communications in the SCG by enabling the uplink communications to have a higher transmit power (for example, when an overlapping uplink occasion in the MCG is unused by the UE). In some aspects, the described techniques can be used to remove an uncertainty as to whether the UE is to perform the adjustment of the dynamic power sharing between the MCG and the SCG by conditioning the adjustment on a timing of the uplink communication in the SCG and a timing of the transmission of the indication of the unused uplink occasion. This ensures that a network node has enough time to process the indication of the unused uplink occasion and identify that the UE is to perform the adjustment of the dynamic power sharing between the MCG and the SCG. As a result, the network node may accurately determine an expected transmit power of the uplink communication in the SCG, thereby improving a reception performance of the uplink communication.

Figure 6:
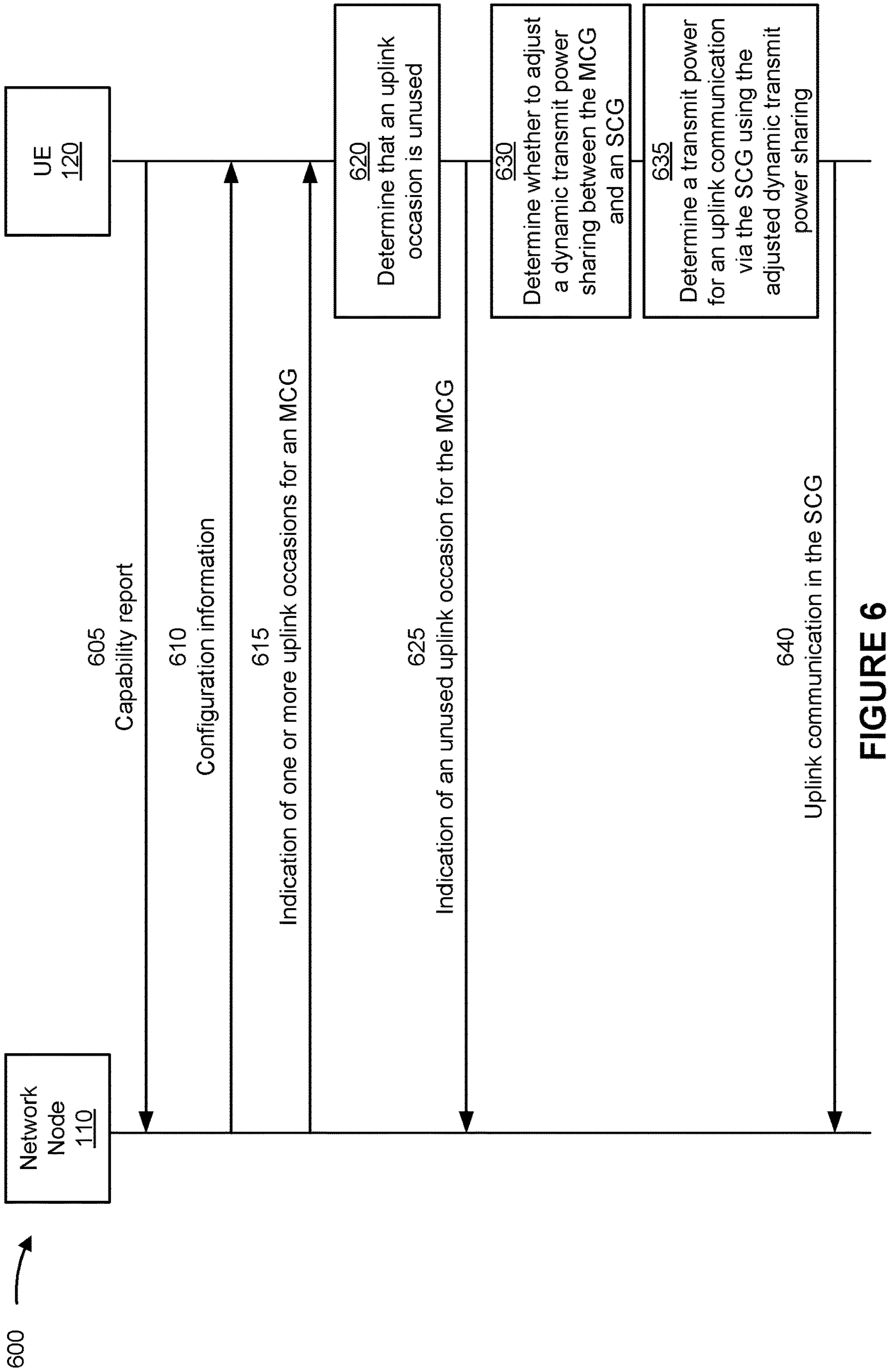
FIG. 6 is a diagram of an example associated with power sharing for unused uplink occasions in accordance with the present disclosure.

FIG. 6 is a diagram of an example 600 associated with power sharing for unused uplink occasions in accordance with the present disclosure. As shown in FIG. 6, a network node 110 (for example, a base station, a CU, a DU, and/or an RU) may communicate with a UE 120. In some aspects, the network node 110 and the UE 120 may be part of a wireless network (for example, the wireless network 100). The UE 120 and the network node 110 may have established a wireless connection prior to operations shown in FIG. 6.

In some aspects, the UE 120 may be operating in a dual connectivity mode. For example, the dual connectivity mode may be an ENDC mode, an NEDC mode an NRDC mode, or another dual connectivity mode. For example, the UE 120 may communicate via an MCG and an SCG. In some aspects, the network node 110 may include multiple network nodes (for example, a first network node associated with the MCG and a second network node associated with the SCG). In some aspects, the network node 110 may communicate with a first network node associated with the MCG and with a second network node associated with the SCG. For example, the network node 110 may be a control entity (for example, a CU) associated with the first network node associated with the MCG and the second network node associated with the SCG. Although examples are described herein in connection with transmit power sharing between the MCG and the SCG, the operations and techniques described herein may be similarly applied for transmit power sharing between uplink transmissions associated with a primary cell (PCell) and a secondary cell (SCell), a primary SCell and another SCell, a first carrier (first component carrier) and a second carrier (second component carrier), and/or a primary component carrier and a secondary component carrier, among other examples.

In a first operation 605, the UE 120 may transmit, and the network node 110 may receive or obtain, a capability report. The UE 120 may transmit the capability report via UE capability signaling, a UE assistance information (UAI) communication, RRC signaling, a PUCCH communication, and/or a PUSCH communication, among other examples. In some aspects, the capability report may be communicated via the MCG. In other aspects, the capability report may be communicated via the SCG.

The capability report may indicate UE support for one or more operations described herein, such as a second operation 610, a third operation 615, a fourth operation 620, a fifth operation 625, a sixth operation 630, a seventh operation 635, and/or an eighth operation 640, as described in more detail elsewhere herein. In some aspects, the UE 120 may indicate that the UE 120 supports dynamic power sharing between MCG cell(s) and SCG cell(s) (for example, via an intraFR-NR-DC-DynamicPwrSharing-r16 UE capability parameter).

In some aspects, the capability report may indicate that the UE 120 supports adjusting a transmit power sharing between the MCG and the SCG associated with indicating unused uplink occasions, as described in more detail elsewhere herein. For example, the capability report may indicate that the UE 120 supports dynamic power saving adjustment between the MCG and the SCG according to a UE indication of one or more unused PUSCH occasion(s) in the MCG. In some aspects, the capability report may indicate that the UE 120 supports determining a transmit power for an uplink transmission in the SCG based on, or otherwise associated with, not reserving transmit power for an unused uplink occasion in the MCG (for example, that at least partially overlaps with the uplink transmission in the time domain) For example, the capability report may indicate that the UE 120 supports determining a transmit power for an uplink transmission in the SCG based on, or otherwise associated with, not reserving transmit power for the unused uplink occasion in the MCG in response to the UE 120 transmitting an indication of the unused uplink occasion (for example, in response to transmitting an indication that the uplink occasion is to be unused or skipped by the UE 120).

In some aspects, the capability report may indicate timing information or information associated with a time deadline associated with adjusting a transmit power sharing between the MCG and the SCG associated with indicating unused uplink occasions, as described in more detail elsewhere herein. For example, adjusting the transmit power sharing between the MCG and the SCG (for example, for an uplink communication via the SCG) may be based on, or otherwise associated with, an amount of time between a first transmission time of an indication that the uplink occasion is unused and a second transmission time of a communication via the SCG satisfying a threshold (for example, an amount of time associated with the threshold may be indicated, or defined, by a time offset parameter). In other words, adjusting the transmit power sharing between the MCG and the SCG may be based on, or otherwise associated with, the first transmission time of the indication that the uplink occasion is unused being at least an amount of time, indicated by a value of a time offset parameter, before the second transmission time of the communication via the SCG. In some aspects, the capability report may indicate a value of the time offset parameter.

In some aspects, the value of the capability report may be based on, or otherwise associated with, a processing capability of the UE 120 associated with DCI. In some aspects, the processing capability may be based on, or otherwise associated with, an MCG processing capability (for example, $$T_{proc,MCG}^{max}$$

as defined, or otherwise fixed, by the 3GPP) and an SCG processing capability (for example, $$T_{proc,SCG}^{max}$$

as defined, or otherwise fixed, by the 3GPP). In some examples, the processing capability may be a time offset value (for example, $T_{offset}$ as defined, or otherwise fixed, by the 3GPP), where a value of the time offset value is the greater of the $$T_{proc,MCG}^{max}$$

or the $$T_{proc,SCG}^{max}.$$

For example, the capability report may indicate the processing capability of the UE 120 associated with DCI. For example, the processing capability may indicate an amount of time associated with the UE 120 processing received DCI (for example, an amount of time before the UE 120 can act or perform operations in response to the DCI). In some aspects, the value of the time offset parameter described herein may be based on, or otherwise associated with, the amount of time associated with the processing capability of the UE 120. For example, the value of the time offset parameter may be the same value as indicated by the processing capability of the UE 120 associated with DCI (for example, the UE 120 and the network node 110 may (re)use the same deadline parameter for DCI format 2_0 or DCI format 2_4 that cancels an MCG uplink transmission). This conserves signaling overhead because the UE 120 does not separately signal values of the time offset parameter and the processing capability of the UE 120.

In some aspects, the UE 120 may determine the value of the time offset parameter (for example, from one or more candidate values indicated by the network node 110 and/or defined, or otherwise fixed, by a wireless communication standard, such as the 3GPP). For example, UE 120 may determine the time offset parameter associated with UE indications of unused uplink occasions (for example, associated with associated with MCG and SCG power sharing for unused uplink occasions). For example, the capability report may include the value of the time offset parameter. In some aspects, the network node 110 may transmit, and the UE 120 may receive, an indication of one or more candidate values of the time offset parameter. In some aspects, the one or more candidate values may be defined, or otherwise fixed, by a wireless communication standard, such as the 3GPP. In such examples, the one or more candidate values may not be communicated between the UE 120 and the network node 110. The UE 120 may select a value of the time offset parameter from the one or more candidate values. For example, the UE 120 may select the value based on, or otherwise associated with, a processing capability of the UE 120 for processing determinations of unused uplink occasions. Additionally or alternatively, the UE 120 may select the value based on, or otherwise associated with, an amount of time associated with the UE 120 making adjustments to a dynamic power sharing between the MCG and the SCG. The UE 120 may transmit, and the network node 110 may receive, an indication of the value of the time offset parameter (for example, that is selected by the UE 120). In other words, the UE 120 may transmit, and the network node 110 may receive, an indication of a preferred value of the time offset parameter described herein. In some aspects, the network node 110 may transmit, and the UE 120 may receive, an indication of whether the value of the time offset parameter (for example, selected by the UE 120) is to be used (for example, the indication of whether the value of the time offset parameter is to be used may be communicated as part of the second operation 610).

In a second operation 610, the network node 110 may transmit, and the UE 120 may receive, configuration information. In some aspects, the UE 120 may receive the configuration information via one or more of RRC signaling, one or more MAC control elements (MAC-CEs), and/or DCI, among other examples. In some aspects, the configuration information may include an indication of one or more configuration parameters for selection by the UE 120, and/or explicit configuration information for the UE 120 to use to configure itself, among other examples.

In some aspects, the configuration information may indicate that the UE is to adjust a dynamic power sharing between the MCG and the SCG for SCG uplink transmissions that at least partially overlap in the time domain with unused MCG uplink occasions that are indicated by the UE 120. For example, the configuration information may indicate that the UE 120 is to allocate at least a portion of a reserved transmit power associated with an unused uplink occasion to a transmit power of the SCG uplink transmission. In other words, the configuration information may indicate that, for transmit power determinations for an uplink transmission in the SCG, the UE 120 may assume that an uplink occasion in the MCG (for example, that at least partially overlaps in the time domain with time domain resources of the uplink transmission in the SCG) that is indicated by the UE 120 as being unused is not transmitted and/or is not present. For example, the configuration information may indicate that no transmit power should be reserved for uplink occasion in the MCG that are indicated by the UE 120 as being unused when determining a transmit power for an uplink transmission in the SCG (for example, that at least partially overlaps in the time domain with time domain resources of the uplink occasion in the MCG).

In some aspects, the configuration information may indicate a value of the time offset parameter. For example, the time offset parameter may be used for setting a deadline for adjusting the dynamic power sharing between the MCG and the SCG for unused uplink occasions in the MCG. For example, the value of the time offset parameter may indicate an allowable time offset between a communication indicating the unused uplink occasion(s) and an uplink transmission in the SCG (for example, that is to be associated with a transmit power determined using the adjusted dynamic power sharing) for the UE 120 to perform the adjusted dynamic power sharing between the MCG and the SCG. For example, the configuration information may indicate that if an amount of time between the communication indicating the unused uplink occasion(s) and the uplink transmission in the SCG is less than an amount of time indicated by the time offset parameter, then the UE 120 is to not adjust the dynamic power sharing between the MCG and the SCG. In such examples, the configuration information may indicate that the UE 120 may assume that the unused uplink occasion is used and/or is present when determining the transmit power for the uplink transmission in the SCG. If the amount of time between the communication indicating the unused uplink occasion(s) and the uplink transmission in the SCG is greater than or equal to an amount of time indicated by the time offset parameter, then the UE 120 may adjust the dynamic power sharing between the MCG and the SCG. In such examples, the configuration information may indicate that the UE 120 may assume that the unused uplink occasion is not used and/or is not present when determining the transmit power for the uplink transmission in the SCG.

In some aspects, the configuration information may include a CG configuration or another configuration of periodic and/or semi-static communications associated with the MCG. For example, the configuration information may indicate one or more uplink occasions associated with the MCG (for example, one or more uplink transmission opportunities via the MCG configured for the UE 120). For example, the one or more uplink occasions may include CG occasions, PUSCH occasions, and/or other periodic or semi-static occasions.

For example, the network node 110 may transmit, and the UE 120 may receive, a CG configuration for the UE 120 and the MCG. In some aspects, the network node 110 may transmit the configuration information (for example, in an RRC communication, in DCI, and/or in another signaling communication) that identifies a CG period associated with multiple CG (or PUSCH) occasions. In some examples, the configuration information may identify one or more CGs and may indicate resource allocations (for example, in a time domain, frequency domain, spatial domain, and/or code domain) associated with respective CG occasions or PUSCH occasions. The CG occasions may be associated with a resource or set of resources available to the UE 120 for transmission of an uplink communication (for example, data and/or control information) in the MCG. For example, the CG configuration may identify resource allocations for a PUSCH in the MCG.

The CG configuration (for example, a configuredGrant-Config of a CG-PUSCH configuration) may indicate that the UE 120 is configured to transmit an indication of unused uplink occasions. For example, the CG configuration may include a parameter (for example, an nrof_UTO_UCI parameter) indicating a quantity of bits to be included in a UTO-UCI for CG PUSCH transmissions for the CG PUSCH configuration. For example, the CG configuration may indicate that the UE 120 is to multiplex a UTO-UCI represented by a bitmap having the quantity of bits in each CH-PUSCH transmission for the CG-PUSCH configuration.

The UE 120 may configure itself based at least in part on the configuration information. In some aspects, the UE 120 may be configured to perform one or more operations described herein based at least in part on the configuration information.

In a third operation 615, the network node 110 may transmit, and the UE 120 may receive, an indication of one or more uplink occasions for the MCG. In some aspects, the indication of the one or more uplink occasions for the MCG may be included in a CG configuration for the MCG (for example, the one or more uplink occasions may be CG occasions). In such examples, the third operation 615 may be performed as part of the second operation 610. In other words, the one or more uplink occasions for the MCG may be CG occasions, periodic uplink occasions, and/or semi-static uplink occasions, among other examples.

In some other aspects, the network node 110 may transmit, and the UE 120 may receive, scheduling information, associated with the MCG, indicating the uplink occasion. The scheduling information may be included in DCI. In other words, the network node 110 may transmit, and the UE 120 may receive, DCI scheduling the one or more uplink occasions. In such examples, the one or more uplink occasions may be dynamic grant (DG) occasions. For example, the one or more uplink occasions may PUSCH occasions for the MCG (for example, DG PUSCH occasions or CG PUSCH occasions).

In a fourth operation 620, the UE 120 may determine that an uplink occasion in the MCG is to be unused or skipped by the UE 120. For example, the UE 120 may determine that there is no uplink data available (for example, in a transmit buffer of the UE 120) for the uplink occasion. Therefore, the UE 120 may determine that the uplink occasion is to be unused or skipped. As another example, the UE 120 may determine that the uplink occasion is invalid. For example, the UE 120 may determine that the uplink occasion is scheduled using resources (for example, a slot or a symbol) that is associated with downlink communications (for example, in a downlink slot or symbol). Therefore, the UE 120 may determine that the uplink occasion is to be unused or skipped.

In a fifth operation 625, the UE 120 may transmit, and the network node 110 may receive, an indication of the unused uplink occasion in the MCG. For example, the UE 120 may transmit an indication of the unused uplink occasion from the one or more uplink occasions (for example, configured or scheduled for the UE 120, such as in the second operation 610 and/or the third operation 615). In some aspects, the UE 120 may support transmitting a dynamic indication of unused PUSCH occasion(s) (for example, unused CG PUSCH occasions and/or unused DG PUSCH occasions) based on, or otherwise associated with, UCI (for example, CG-UCI or another type of UCI). For example, the indication of the unused uplink occasion may be included in a UCI communication (for example, that is transmitted via a PUCCH or a PUSCH). In some aspects, the indication of the unused uplink occasion may be communicated via the MCG. In other aspects, the indication of the unused uplink occasion may be communicated via the SCG.

For example, in the fifth operation 625, the UE 120 may transmit, and the network node 110 may receive, a UTO-UCI communication indicating the unused uplink occasion. The UTO-UCI communication may be multiplexed in a CG transmission. The UTO-UCI communication may include a bitmap having a quantity of bits. The bits may have a one-to-one mapping to CG PUSCH occasions in ascending order of start time. A bit value of "0" may indicate that the UE 120 may transmit using a corresponding uplink occasion (for example, a CG-PUSCH occasion), and a bit value of "1" may indicate that the UE 120 will not transmit using a corresponding uplink occasion (for example, a CG-PUSCH occasion). For example, to indicate the unused uplink occasion, the UE 120 may transmit a UTO-UCI that includes a bit (corresponding to the uplink occasion) having a bit value of "1."

In a sixth operation 630, the UE 120 may determine whether to adjust a dynamic transmit power sharing between the MCG and the SCG (for example, in response to transmitting the indication of the unused uplink occasion in the fifth operation 625). For example, the UE 120 may determine whether to adjust a dynamic transmit power sharing between the MCG and the SCG for an uplink communication in the SCG that is associated with time domain resources that at least partially overlap with time domain resources of the unused uplink occasion in the MCG. As used herein, "adjusting" the dynamic transmit power sharing between the MCG and the SCG may refer to the UE 120 allocating at least a portion of a reserved transmit power for the unused uplink occasion to the uplink communication in the SCG. In other words, adjusting the dynamic transmit power sharing between the MCG and the SCG may refer to the UE 120 not reserving uplink transmit power for the unused uplink occasion when determining the transmit power for the uplink communication in the SCG. This enables the UE 120 to transmit the uplink occasion in the SCG with a larger transmit power (for example, because otherwise the UE 120 may reserve the transmit power needed to transmit via the unused uplink occasion in the MCG when determining the transmit power for the uplink communication in the SCG, resulting in a lower transmit power). Transmitting the uplink communication in the SCG with the larger transmit power increases the reliability of the uplink communication and/or improves the performance of the uplink communication.

In some aspects, the UE 120 may determine whether to adjust the dynamic transmit power sharing between the MCG and the SCG based on, or otherwise associated with, a timing of the transmission of the indication of the unused uplink occasion (for example, transmitted as part of the fifth operation 625) and a timing of the uplink communication in the SCG. For example, the UE 120 may determine whether to adjust the dynamic transmit power sharing between the MCG and the SCG based on, or otherwise associated with, whether an amount of time between a first time (for example, a transmission time at the UE 120 or a reception time at the network node 110) of the indication that the uplink occasion is unused and a second time (for example, a transmission time at the UE 120 or a reception time at the network node 110) of the uplink communication in the SCG satisfying a threshold (for example, a threshold indicated by the time offset parameter). For example, if the amount of time satisfies the threshold, then the UE 120 may determine that the dynamic transmit power sharing between the MCG and the SCG is to be adjusted for determining the transmit power of the uplink communication in the SCG. If the amount of time satisfies the threshold, then the UE 120 may determine that the dynamic transmit power sharing between the MCG and the SCG is not to be adjusted for determining the transmit power of the uplink communication in the SCG.

In other words, the UE 120 may determine whether to adjust the dynamic transmit power sharing between the MCG and the SCG based on, or otherwise associated with, whether the first time (for example, a transmission time at the UE 120 or a reception time at the network node 110) of the indication that the uplink occasion is unused (for example, associated with the fifth operation 625) is at least an amount of time, indicated by the value of the time offset parameter, before the second time of the communication (for example, a transmission time at the UE 120 or a reception time at the network node 110). For example, if the first transmission time is at least the amount of time before the second transmission time, then the UE 120 may determine that the dynamic transmit power sharing between the MCG and the SCG is to be adjusted for determining the transmit power of the uplink communication in the SCG. If the first transmission time is less than the amount of time before the second transmission time, then the UE 120 may determine that the dynamic transmit power sharing between the MCG and the SCG is not to be adjusted for determining the transmit power of the uplink communication in the SCG.

In a seventh operation 635, the UE 120 may determine a transmit power for the uplink communication in the SCG using the adjusted dynamic transmit power sharing between the MCG and the SCG (for example, in response to determining that the dynamic transmit power sharing between the MCG and the SCG is to be adjusted in the sixth operation 630). As described elsewhere herein, the uplink communication in the SCG may at least partially overlap, in the time domain, with the unused uplink occasion in the MCG. For example, the UE 120 may not reserve a transmit power for the unused uplink occasion in the MCG when determining the transmit power for the uplink communication in the SCG. In other words, when performing the dynamic transmit power sharing between the MCG and the SCG for determining the transmit power for the uplink communication in the SCG, the UE 120 may assume that the unused uplink occasion is not used for transmission and/or is not present. For example, when the UE 120 indicates that an uplink transmission occasion (for example, a CG PUSCH occasion or a dynamically scheduled PUSCH occasion) in the MCG is unused, then the UE 120 may assume no power on the MCG is used for the uplink transmission occasion when the UE 120 determines the uplink transmit power for a SCG transmission that overlaps with the uplink transmission occasion in the MCG.

For example, the UE 120 may allocate at least a portion of a reserved transmit power associated with the unused uplink occasion in the MCG to the transmit power of the uplink communication in the SCG. The portion of the reserved transmit power may be based on, or otherwise associated with, a transmit power for the uplink communication that is determined based on, or otherwise associated with, radio conditions. For example, the UE 120 may determine a transmit power ($P_1$) for the uplink communication based on, or otherwise associated with, one or more communication parameters of a link associated with the SCG. The one or more communication parameters may include a pathloss, an RSRP, and/or a signal-to-noise ratio (SNR), among other examples. If the UE 120 were to perform dynamic transmit power sharing (for example, as described in more detail elsewhere herein) assuming that the unused uplink occasion in the MCG is present, then the UE 120 may determine a lower transmit power for the uplink communication in the SCG ($P_2$) based on, or otherwise associated with, allocating the transmit power for the unused uplink occasion in the MCG and based on, or otherwise associated with, a transmit power budget or limit associated with the UE 120. The portion of the reserved transmit power may be based on, or otherwise associated with, a different between $P_1$ and $P_2$. For example, the UE 120 may be associated with a transmit power limit associated with a sum of an MCG transmit power used for uplink transmission via the MCG and an SCG transmit power, including the transmit power, used for uplink transmission via the SCG. The UE 120 may determine the transmit power based on, or otherwise associated with, the transmit power limit and by allocating no transmit power, to the MCG transmit power, for the unused uplink occasion. For example, the UE 120 may determine that the transmit power for the uplink communication in the SCG is $P_1$ based on, or otherwise associated with, adjusting the dynamic transmit power sharing to not reserve transmit power for the unused uplink occasion in the MCG.

In an eighth operation 640, the UE 120 may transmit, and the network node 110 may receive or obtain, the uplink communication in the SCG (for example, in a cell included in the SCG). The UE 120 may transmit the uplink communication using the transmit power (for example, determined in the seventh operation 625). For example, the transmit power may be determined based on, or otherwise associated with, the UE 120 assuming that the unused uplink occasion is not present in the MCG when performing the dynamic transmit power sharing between the MCG and the SCG. This enables the UE 120 to reclaim uplink power from the MCG and to use a higher transmit power for the uplink communication in the SCG. Transmitting the uplink communication in the SCG using a higher transmit power improves a reliability of the uplink communication and/or improves a performance of the uplink communication.

Figure 7:
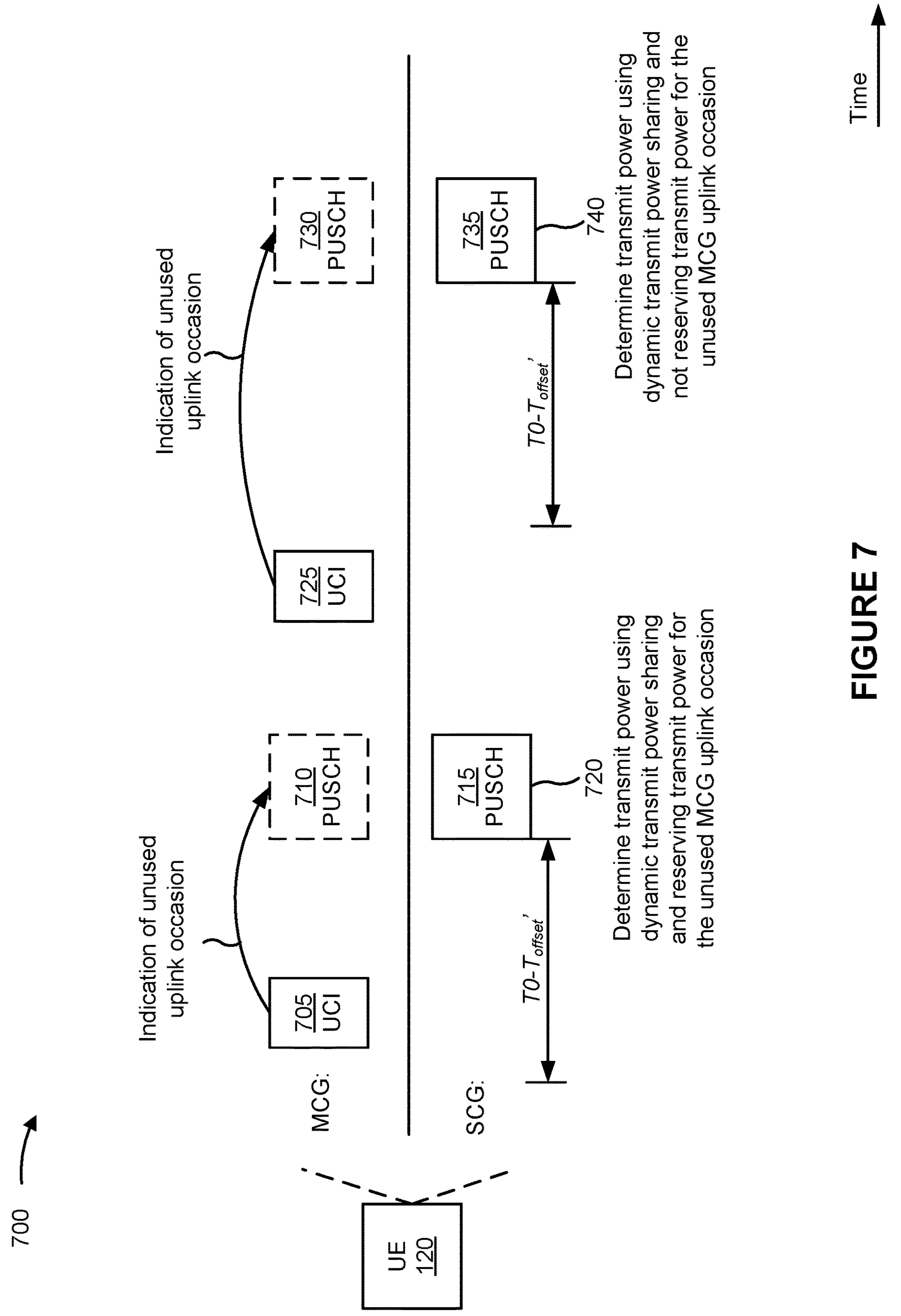
FIG. 7 is a diagram of an example associated with power sharing for unused uplink occasions in accordance with the present disclosure.

FIG. 7 is a diagram of an example 700 associated with power sharing for unused uplink occasions in accordance with the present disclosure. As shown in FIG. 7, for transmit power determination of uplink transmission in the SCG starting at a time T0, there may be a deadline T0-$T_{offset}$' For example, $T_{offset}$' may be the time offset parameter described elsewhere herein. For example, for a UE indication of an unused uplink occasion in the MCG that is transmitted by UE 120 before the deadline, the UE 120 may assume no power on the MCG is used for the unused uplink occasion when the UE 120 determines the uplink transmit power for an SCG transmission that overlaps with the uplink transmission occasion in the MCG, as described in more detail elsewhere herein. However, for a UE indication of an unused uplink occasion in the MCG that is transmitted by UE 120 after the deadline, the UE 120 may assume power on the MCG is used for the unused uplink occasion when the UE 120 determines the uplink transmit power for an SCG transmission that overlaps with the uplink transmission occasion in the MCG.

For example, the UE 120 may transmit, and the network node 110 (not shown in FIG. 7) may receive, an indication 705 of an unused uplink occasion 710 in the MCG. For example, the UE 120 may transmit UCI indicating the unused uplink occasion in the MCG (for example, in a similar manner as described in connection with FIG. 5 and/or the fifth operation 625). As shown in FIG. 7, the UE 120 may transmit an uplink communication 715 in the SCG that at least partially overlaps in the time domain with the unused uplink occasion 710 in the MCG. However, the indication 705 of the unused uplink occasion in the MCG may be transmitted by the UE 120 after a deadline (for example, the deadline may be T0-$T_{offset}'$, where T0 is the time at which the uplink communication 715 in the SCG is to be transmitted and $T_{offset}'$ may be an amount of time indicated by the time offset parameter described elsewhere herein). Therefore, in a first operation 720, the UE 120 may determine the transmit power for the uplink communication 715 in the SCG based on, or otherwise associated with, reserving transmit power in the MCG for the unused uplink occasion 710. In other words, the UE 120 may determine the transmit power for the uplink communication 715 in the SCG assuming that the unused uplink occasion 710 is present in the MCG (for example, because the indication 705 of the unused uplink occasion is transmitted after the deadline of T0-$T_{offset}'$).

As further shown in FIG. 7, the UE 120 may transmit, and the network node 110 may receive, an indication 725 of an unused uplink occasion 730 in the MCG. For example, the UE 120 may transmit UCI indicating the unused uplink occasion in the MCG (for example, in a similar manner as described in connection with FIG. 5 and/or the fifth operation 625). As shown in FIG. 7, the UE 120 may transmit an uplink communication 735 in the SCG that at least partially overlaps in the time domain with the unused uplink occasion 730 in the MCG. As shown in FIG. 7, the indication 725 of the unused uplink occasion in the MCG may be transmitted by the UE 120 before a deadline (for example, the deadline may be T0-$T_{offset}'$, where T0 is the time at which the uplink communication 735 in the SCG is to be transmitted and $T_{offset}'$ may be an amount of time indicated by the time offset parameter described elsewhere herein). Therefore, in a second operation 740, the UE 120 may determine the transmit power for the uplink communication 735 in the SCG based on, or otherwise associated with, not reserving transmit power in the MCG for the unused uplink occasion 730. In other words, the UE 120 may determine the transmit power for the uplink communication 735 in the SCG assuming that the unused uplink occasion 730 is not present in the MCG (for example, because the indication 725 of the unused uplink occasion is transmitted before the deadline of T0-$T_{offset}'$).

Figure 8:
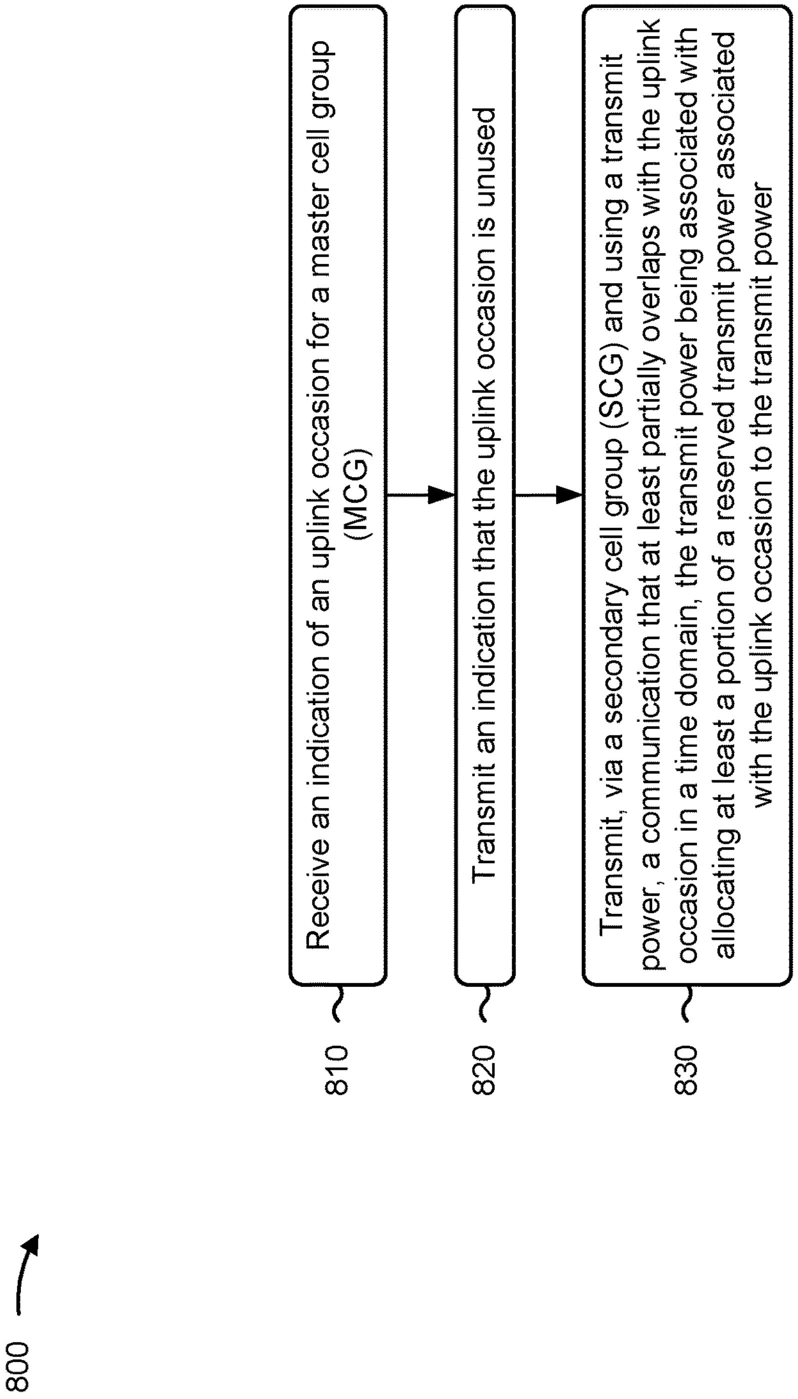
FIG. 8 is a diagram illustrating an example process performed, for example, by a UE, associated with power sharing for unused uplink occasions in accordance with the present disclosure.

FIG. 8 is a diagram illustrating an example process 800 performed, for example, by a UE, associated with power sharing for unused uplink occasions in accordance with the present disclosure. Example process 800 is an example where the UE (for example, UE 120) performs operations associated with power sharing for unused uplink occasions.

As shown in FIG. 8, in some aspects, process 800 may include receiving an indication of an uplink occasion for an MCG (block 810). For example, the UE (for example, using reception component 1002 and/or communication manager 1006, depicted in FIG. 10) may receive an indication of an uplink occasion for an MCG, as described above.

As further shown in FIG. 8, in some aspects, process 800 may include transmitting an indication that the uplink occasion is unused (block 820). For example, the UE (for example, using transmission component 1004 and/or communication manager 1006, depicted in FIG. 10) may transmit an indication that the uplink occasion is unused, as described above. In some aspects, the indication that the uplink occasion is unused may be included in a UCI communication, such as a UTO-UCI communication.

As further shown in FIG. 8, in some aspects, process 800 may include transmitting, via an SCG and using a transmit power, a communication that at least partially overlaps with the uplink occasion in a time domain, the transmit power being associated with allocating at least a portion of a reserved transmit power associated with the uplink occasion to the transmit power (block 830). For example, the UE (for example, using transmission component 1004 and/or communication manager 1006, depicted in FIG. 10) may transmit, via an SCG and using a transmit power, a communication that at least partially overlaps with the uplink occasion in a time domain, the transmit power being associated with allocating at least a portion of a reserved transmit power associated with the uplink occasion to the transmit power, as described above.

Process 800 may include additional aspects, such as any single aspect or any combination of aspects described below and/or in connection with one or more other processes described elsewhere herein.

In a first aspect, allocating at least the portion of the reserved transmit power associated with the uplink occasion to the transmit power is in response to transmitting the indication that the uplink occasion is unused.

In a second aspect, alone or in combination with the first aspect, the UE is associated with a transmit power limit associated with a sum of an MCG transmit power used for uplink transmission via the MCG and an SCG transmit power, including the transmit power, used for uplink transmission via the SCG, and a value of the transmit power being determined associated with the transmit power limit and by allocating no transmit power, to the MCG transmit power, for the uplink occasion.

In a third aspect, alone or in combination with one or more of the first and second aspects, allocating at least the portion of the reserved transmit power associated with the uplink occasion to the transmit power is associated with an amount of time between a first transmission time of the indication that the uplink occasion is unused and a second transmission time of the communication satisfying a threshold.

In a fourth aspect, alone or in combination with one or more of the first through third aspects, allocating at least the portion of the reserved transmit power associated with the uplink occasion to the transmit power is associated with a first transmission time of the indication that the uplink occasion is unused being at least an amount of time, indicated by a value of a time offset parameter, before a second transmission time of the communication.

In a fifth aspect, alone or in combination with one or more of the first through fourth aspects, process 800 includes transmitting a capability report indicating a processing capability of the UE associated with downlink control information, the value of the time offset parameter being associated with the processing capability.

In a sixth aspect, alone or in combination with one or more of the first through fifth aspects, the time offset parameter is associated with power sharing for unused uplink occasions.

In a seventh aspect, alone or in combination with one or more of the first through sixth aspects, process 800 includes receiving, from a network node, an indication of the value of the time offset parameter configured by the network node.

In an eighth aspect, alone or in combination with one or more of the first through seventh aspects, process 800 includes receiving, from a network node, an indication of one or more candidate values of the time offset parameter, selecting the value of the time offset parameter from the one or more candidate values, and transmitting, to the network node, an indication of the value of the time offset parameter.

In a ninth aspect, alone or in combination with one or more of the first through eighth aspects, process 800 includes transmitting, to a network node, an indication of the value of the time offset parameter, and receiving, from the network node, an indication of whether the value of the time offset parameter is to be used.

In a tenth aspect, alone or in combination with one or more of the first through ninth aspects, process 800 includes transmitting a capability report indicating that the UE supports adjusting a transmit power sharing between the MCG and the SCG associated with indicating unused uplink occasions, and allocating at least the portion of the reserved transmit power associated with the uplink occasion to the transmit power being associated with transmitting the capability report.

In an eleventh aspect, alone or in combination with one or more of the first through tenth aspects, the indication that the uplink occasion is unused is communicated via the MCG.

In a twelfth aspect, alone or in combination with one or more of the first through eleventh aspects, the indication that the uplink occasion is unused is communicated via the SCG.

In a thirteenth aspect, alone or in combination with one or more of the first through twelfth aspects, the uplink occasion is a configured grant occasion.

In a fourteenth aspect, alone or in combination with one or more of the first through thirteenth aspects, receiving the indication of the uplink occasion includes receiving a configured grant configuration, associated with the MCG, indicating the configured grant occasion.

In a fifteenth aspect, alone or in combination with one or more of the first through fourteenth aspects, receiving the indication of the uplink occasion includes receiving scheduling information, associated with the MCG, indicating the uplink occasion.

In a sixteenth aspect, alone or in combination with one or more of the first through fifteenth aspects, the scheduling information is included in downlink control information.

In a seventeenth aspect, alone or in combination with one or more of the first through sixteenth aspects, the uplink occasion is a physical uplink shared channel (PUSCH) occasion.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
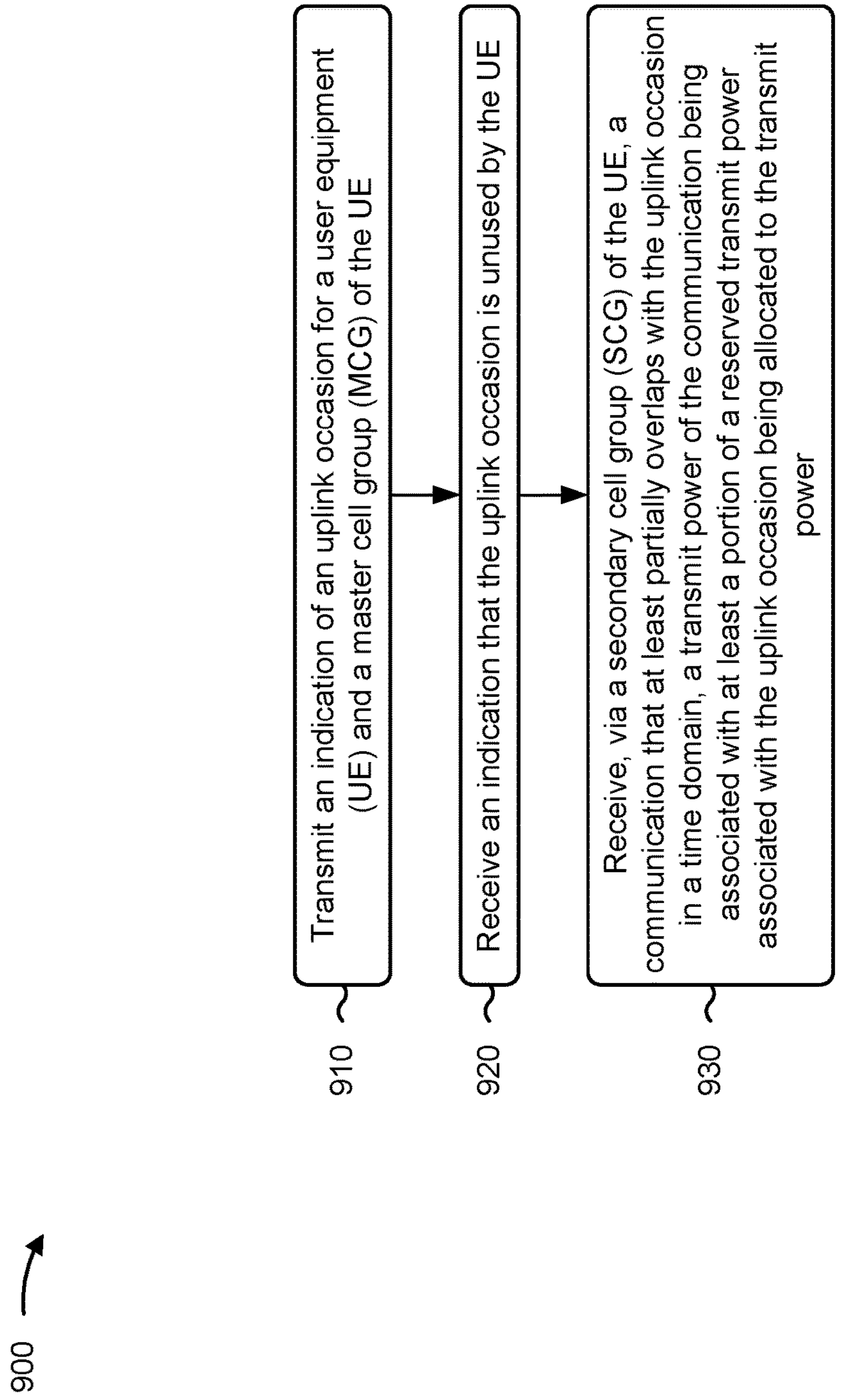
FIG. 9 is a diagram illustrating an example process performed, for example, by a network node, associated with power sharing for unused uplink occasions in accordance with the present disclosure.

FIG. 9 is a diagram illustrating an example process 900 performed, for example, by a network node, associated with power sharing for unused uplink occasions in accordance with the present disclosure. Example process 900 is an example where the network node (for example, network node 110) performs operations associated with power sharing for unused uplink occasions.

As shown in FIG. 9, in some aspects, process 900 may include transmitting an indication of an uplink occasion for a UE and an MCG of the UE (block 910). For example, the network node (for example, using transmission component 1104 and/or communication manager 1106, depicted in FIG. 11) may transmit an indication of an uplink occasion for a UE and an MCG of the UE, as described above.

As further shown in FIG. 9, in some aspects, process 900 may include receiving an indication that the uplink occasion is unused by the UE (block 920). For example, the network node (for example, using reception component 1102 and/or communication manager 1106, depicted in FIG. 11) may receive an indication that the uplink occasion is unused by the UE, as described above.

As further shown in FIG. 9, in some aspects, process 900 may include receiving, via an SCG of the UE, a communication that at least partially overlaps with the uplink occasion in a time domain, a transmit power of the communication being associated with at least a portion of a reserved transmit power associated with the uplink occasion being allocated to the transmit power (block 930). For example, the network node (for example, using reception component 1102 and/or communication manager 1106, depicted in FIG. 11) may receive, via an SCG of the UE, a communication that at least partially overlaps with the uplink occasion in a time domain, a transmit power of the communication being associated with at least a portion of a reserved transmit power associated with the uplink occasion being allocated to the transmit power, as described above.

Process 900 may include additional aspects, such as any single aspect or any combination of aspects described below and/or in connection with one or more other processes described elsewhere herein.

In a first aspect, at least the portion of the reserved transmit power associated with the uplink occasion being allocated to the transmit power is associated with receiving the indication that the uplink occasion is unused.

In a second aspect, alone or in combination with the first aspect, the UE is associated with a transmit power limit associated with a sum of an MCG transmit power used for uplink transmission via the MCG and an SCG transmit power, including the transmit power, used for uplink transmission via the SCG, and a value of the transmit power being determined associated with the transmit power limit and associated with no transmit power being allocated for the uplink occasion, to the MCG transmit power, for the uplink occasion.

In a third aspect, alone or in combination with one or more of the first and second aspects, at least the portion of the reserved transmit power associated with the uplink occasion being allocated to the transmit power is associated with an amount of time between a first reception time of the indication that the uplink occasion is unused and a second reception time of the communication satisfying a threshold.

In a fourth aspect, alone or in combination with one or more of the first through third aspects, at least the portion of the reserved transmit power associated with the uplink occasion being allocated to the transmit power is associated with a first reception time of the indication that the uplink occasion is unused being at least an amount of time, indicated by a value of a time offset parameter, before a second reception time of the communication.

In a fifth aspect, alone or in combination with one or more of the first through fourth aspects, process 900 includes receiving a capability report, associated with the UE, indicating a processing capability of the UE associated with downlink control information, the value of the time offset parameter being associated with the processing capability.

In a sixth aspect, alone or in combination with one or more of the first through fifth aspects, the time offset parameter is associated with power sharing for unused uplink occasions.

In a seventh aspect, alone or in combination with one or more of the first through sixth aspects, process 900 includes transmitting an indication, for the UE, of the value of the time offset parameter configured by the network node.

In an eighth aspect, alone or in combination with one or more of the first through seventh aspects, process 900 includes transmitting an indication, for the UE, of one or more candidate values of the time offset parameter, and receiving an indication, associated with the UE, of the value, from the one or more candidate values, of the time offset parameter.

In a ninth aspect, alone or in combination with one or more of the first through eighth aspects, process 900 includes receiving an indication, associated with the UE, of the value of the time offset parameter, and transmitting an indication, for the UE, of whether the value of the time offset parameter is to be used.

In a tenth aspect, alone or in combination with one or more of the first through ninth aspects, process 900 includes receiving a capability report, associated with the UE, indicating that the UE supports adjusting a transmit power sharing between the MCG and the SCG associated with indicating unused uplink occasions, and at least the portion of the reserved transmit power associated with the uplink occasion being allocated to the transmit power is associated with receiving the capability report.

In an eleventh aspect, alone or in combination with one or more of the first through tenth aspects, the indication that the uplink occasion is unused is communicated via the MCG.

In a twelfth aspect, alone or in combination with one or more of the first through eleventh aspects, the indication that the uplink occasion is unused is communicated via the SCG.

In a thirteenth aspect, alone or in combination with one or more of the first through twelfth aspects, the uplink occasion is a configured grant occasion.

In a fourteenth aspect, alone or in combination with one or more of the first through thirteenth aspects, transmitting the indication of the uplink occasion includes transmitting a configured grant configuration, associated with the MCG, indicating the configured grant occasion.

In a fifteenth aspect, alone or in combination with one or more of the first through fourteenth aspects, transmitting the indication of the uplink occasion includes transmitting scheduling information, associated with the MCG, indicating the uplink occasion.

In a sixteenth aspect, alone or in combination with one or more of the first through fifteenth aspects, the scheduling information is included in downlink control information.

In a seventeenth aspect, alone or in combination with one or more of the first through sixteenth aspects, the uplink occasion is a PUSCH occasion.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
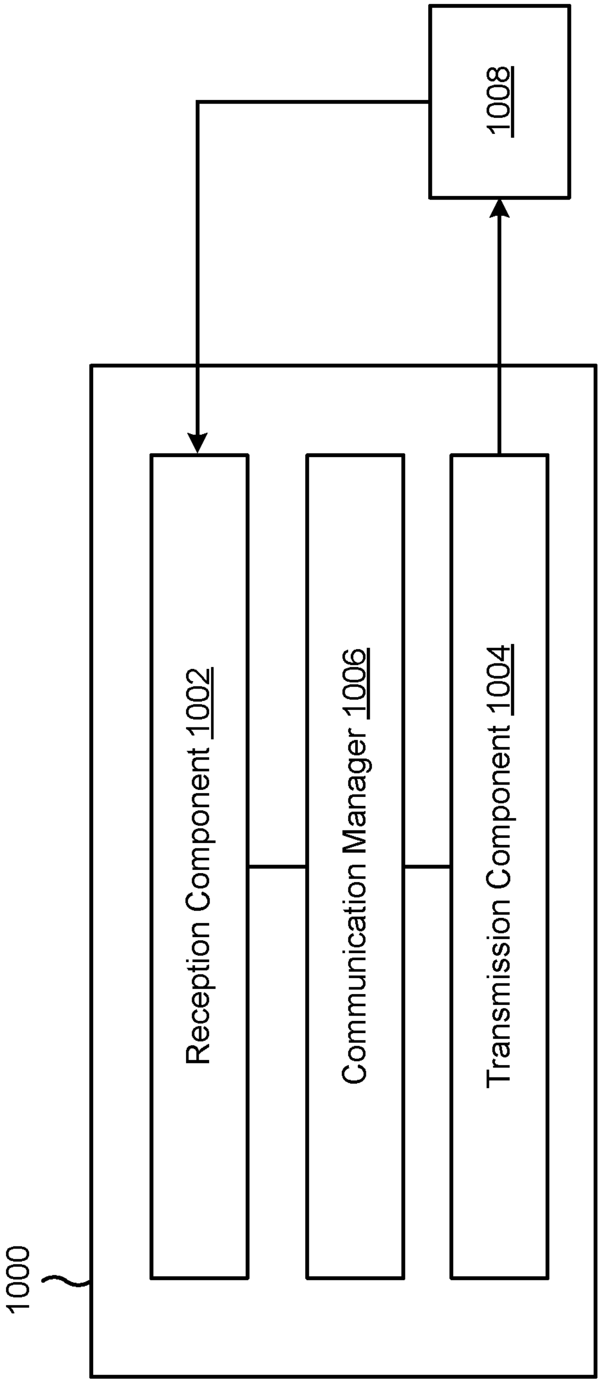
FIG. 10 is a diagram of an example apparatus for wireless communication associated with power sharing for unused uplink occasions in accordance with the present disclosure.

FIG. 10 is a diagram of an example apparatus 1000 for wireless communication associated with power sharing for unused uplink occasions in accordance with the present disclosure. The apparatus 1000 may be a UE, or a UE may include the apparatus 1000. In some aspects, the apparatus 1000 includes a reception component 1002, a transmission component 1004, and/or a communication manager 1006, which may be in communication with one another (for example, via one or more buses and/or one or more other components). In some aspects, the communication manager 1006 is the communication manager 140 described in connection with FIG. 1. As shown, the apparatus 1000 may communicate with another apparatus 1008, such as a UE or a network node (such as a CU, a DU, an RU, or a base station), using the reception component 1002 and the transmission component 1004.

In some aspects, the apparatus 1000 may be configured to perform one or more operations described herein in connection with FIGS. 6 and 7. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1008. The reception component 1002 may provide received communications to one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1008. In some aspects, one or more other components of the apparatus 1000 may generate communications and may provide the generated communications to the transmission component 1004 for transmission to the apparatus 1008. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The communication manager 1006 may support operations of the reception component 1002 and/or the transmission component 1004. For example, the communication manager 1006 may receive information associated with configuring reception of communications by the reception component 1002 and/or transmission of communications by the transmission component 1004. Additionally, or alternatively, the communication manager 1006 may generate and/or provide control information to the reception component 1002 and/or the transmission component 1004 to control reception and/or transmission of communications.

The reception component 1002 may receive an indication of an uplink occasion for an MCG. The transmission component 1004 may transmit an indication that the uplink occasion is unused. The transmission component 1004 may transmit, via an SCG and using a transmit power, a communication that at least partially overlaps with the uplink occasion in a time domain, the transmit power being associated with allocating at least a portion of a reserved transmit power associated with the uplink occasion to the transmit power.

The transmission component 1004 may transmit a capability report indicating a processing capability of the UE associated with downlink control information the value of the time offset parameter being associated with the processing capability.

The reception component 1002 may receive, from a network node, an indication of the value of the time offset parameter configured by the network node.

The reception component 1002 may receive, from a network node, an indication of one or more candidate values of the time offset parameter.

The communication manager 1006 may select the value of the time offset parameter from the one or more candidate values.

The transmission component 1004 may transmit, to the network node, an indication of the value of the time offset parameter.

The transmission component 1004 may transmit, to a network node, an indication of the value of the time offset parameter.

The reception component 1002 may receive, from the network node, an indication of whether the value of the time offset parameter is to be used.

The transmission component 1004 may transmit a capability report indicating that the UE supports adjusting a transmit power sharing between the MCG and the SCG associated with indicating unused uplink occasions, and allocating at least the portion of the reserved transmit power associated with the uplink occasion to the transmit power being associated with transmitting the capability report.

The quantity and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
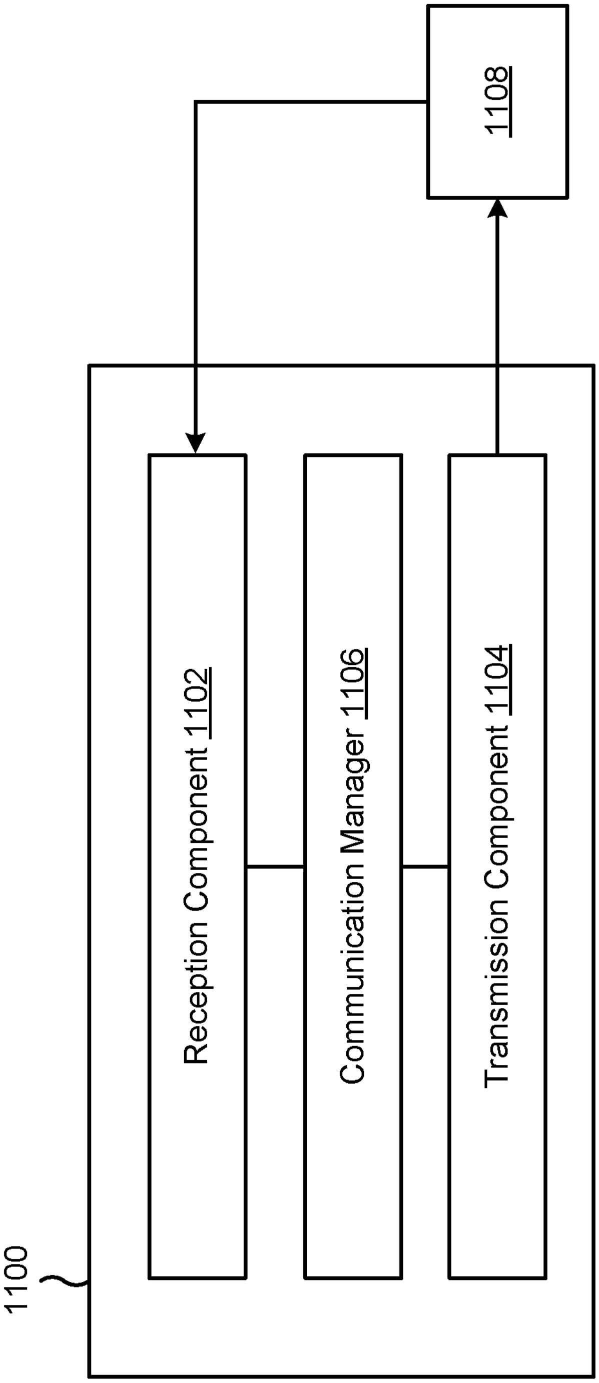
FIG. 11 is a diagram of an example apparatus for wireless communication associated with power sharing for unused uplink occasions in accordance with the present disclosure.

FIG. 11 is a diagram of an example apparatus 1100 for wireless communication associated with power sharing for unused uplink occasions in accordance with the present disclosure. The apparatus 1100 may be a network node, or a network node may include the apparatus 1100. In some aspects, the apparatus 1100 includes a reception component 1102, a transmission component 1104, and/or a communication manager 1106, which may be in communication with one another (for example, via one or more buses and/or one or more other components). In some aspects, the communication manager 1106 is the communication manager 150 described in connection with FIG. 1. As shown, the apparatus 1100 may communicate with another apparatus 1108, such as a UE or a network node (such as a CU, a DU, an RU, or a base station), using the reception component 1102 and the transmission component 1104.

In some aspects, the apparatus 1100 may be configured to perform one or more operations described herein in connection with FIGS. 6 and 7. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the network node described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1108. The reception component 1102 may provide received communications to one or more other components of the apparatus 1100. In some aspects, the reception component 1102 may include one or more antennas, a modem, a demodulator, a MIMO detector, a receive processor, a controller/processor, a memory, or a combination thereof, of the network node described in connection with FIG. 2. In some aspects, the reception component 1102 and/or the transmission component 1104 may include or may be included in a network interface. The network interface may be configured to obtain and/or output signals for the apparatus 1100 via one or more communications links, such as a backhaul link, a midhaul link, and/or a fronthaul link The transmission component 1104 may transmit communications, such as reference signals, control information, data communications, or a combination thereof, to the apparatus 1108. In some aspects, one or more other components of the apparatus 1100 may generate communications and may provide the generated communications to the transmission component 1104 for transmission to the apparatus 1108. In some aspects, the transmission component 1104 may include one or more antennas, a modem, a modulator, a transmit MIMO processor, a transmit processor, a controller/processor, a memory, or a combination thereof, of the network node described in connection with FIG. 2. In some aspects, the transmission component 1104 may be co-located with the reception component 1102 in a transceiver.

The communication manager 1106 may support operations of the reception component 1102 and/or the transmission component 1104. For example, the communication manager 1106 may receive information associated with configuring reception of communications by the reception component 1102 and/or transmission of communications by the transmission component 1104. Additionally, or alternatively, the communication manager 1106 may generate and/or provide control information to the reception component 1102 and/or the transmission component 1104 to control reception and/or transmission of communications.

The transmission component 1104 may transmit an indication of an uplink occasion for a UE and an MCG of the UE. The reception component 1102 may receive an indication that the uplink occasion is unused by the UE. The reception component 1102 may receive, via an SCG of the UE, a communication that at least partially overlaps with the uplink occasion in a time domain, a transmit power of the communication being associated with at least a portion of a reserved transmit power associated with the uplink occasion being allocated to the transmit power.

The reception component 1102 may receive a capability report, associated with the UE, indicating a processing capability of the UE associated with downlink control information the value of the time offset parameter being associated with the processing capability.

The transmission component 1104 may transmit an indication, for the UE, of the value of the time offset parameter configured by the network node.

The transmission component 1104 may transmit an indication, for the UE, of one or more candidate values of the time offset parameter.

The reception component 1102 may receive an indication, associated with the UE, of the value, from the one or more candidate values, of the time offset parameter.

The reception component 1102 may receive an indication, associated with the UE, of the value of the time offset parameter.

The transmission component 1104 may transmit an indication, for the UE, of whether the value of the time offset parameter is to be used.

The reception component 1102 may receive a capability report, associated with the UE, indicating that the UE supports adjusting a transmit power sharing between the MCG and the SCG associated with indicating unused uplink occasions, and at least the portion of the reserved transmit power associated with the uplink occasion being allocated to the transmit power is associated with receiving the capability report.

The quantity and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: receiving an indication of an uplink occasion for a master cell group (MCG); transmitting an indication that the uplink occasion is unused; and transmitting, via a secondary cell group (SCG) and using a transmit power, a communication that at least partially overlaps with the uplink occasion in a time domain, the transmit power being associated with allocating at least a portion of a reserved transmit power associated with the uplink occasion to the transmit power.

Aspect 2: The method of Aspect 1, wherein allocating at least the portion of the reserved transmit power associated with the uplink occasion to the transmit power is in response to transmitting the indication that the uplink occasion is unused.

Aspect 3: The method of any of Aspects 1-2, wherein the UE is associated with a transmit power limit associated with a sum of an MCG transmit power used for uplink transmission via the MCG and an SCG transmit power, including the transmit power, used for uplink transmission via the SCG, and a value of the transmit power being determined associated with the transmit power limit and by allocating no transmit power, to the MCG transmit power, for the uplink occasion.

Aspect 4: The method of any of Aspects 1-3, wherein allocating at least the portion of the reserved transmit power associated with the uplink occasion to the transmit power is associated with an amount of time between a first transmission time of the indication that the uplink occasion is unused and a second transmission time of the communication satisfying a threshold.

Aspect 5: The method of any of Aspects 1-4, wherein allocating at least the portion of the reserved transmit power associated with the uplink occasion to the transmit power is associated with a first transmission time of the indication that the uplink occasion is unused being at least an amount of time, indicated by a value of a time offset parameter, before a second transmission time of the communication.

Aspect 6: The method Aspect 5, further comprising: transmitting a capability report indicating a processing capability of the UE associated with downlink control information, the value of the time offset parameter being associated with the processing capability.

Aspect 7: The method of any of Aspects 5-6, wherein the time offset parameter is associated with power sharing for unused uplink occasions.

Aspect 8: The method of any of Aspects 5-7, further comprising: receiving, from a network node, an indication of the value of the time offset parameter configured by the network node.

Aspect 9: The method of any of Aspects 5-8, further comprising: receiving, from a network node, an indication of one or more candidate values of the time offset parameter; selecting the value of the time offset parameter from the one or more candidate values; and transmitting, to the network node, an indication of the value of the time offset parameter.

Aspect 10: The method of any of Aspects 5-9, further comprising: transmitting, to a network node, an indication of the value of the time offset parameter; and receiving, from the network node, an indication of whether the value of the time offset parameter is to be used.

Aspect 11: The method of any of Aspects 1-10, further comprising: transmitting a capability report indicating that the UE supports adjusting a transmit power sharing between the MCG and the SCG associated with indicating unused uplink occasions, and allocating at least the portion of the reserved transmit power associated with the uplink occasion to the transmit power being associated with transmitting the capability report.

Aspect 12: The method of any of Aspects 1-11, wherein the indication that the uplink occasion is unused is communicated via the MCG.

Aspect 13: The method of any of Aspects 1-12, wherein the indication that the uplink occasion is unused is communicated via the SCG.

Aspect 14: The method of any of Aspects 1-13, wherein the uplink occasion is a configured grant occasion.

Aspect 15: The method of Aspect 14, wherein receiving the indication of the uplink occasion comprises: receiving a configured grant configuration, associated with the MCG, indicating the configured grant occasion.

Aspect 16: The method of any of Aspects 1-15, wherein receiving the indication of the uplink occasion comprises: receiving scheduling information, associated with the MCG, indicating the uplink occasion.

Aspect 17: The method of Aspect 16, wherein the scheduling information is included in downlink control information.

Aspect 18: The method of any of Aspects 1-17, wherein the uplink occasion is a physical uplink shared channel (PUSCH) occasion.

Aspect 19: A method of wireless communication performed by a network node, comprising: transmitting an indication of an uplink occasion for a user equipment (UE)

and a master cell group (MCG) of the UE; receiving an indication that the uplink occasion is unused by the UE; and receiving, via a secondary cell group (SCG) of the UE, a communication that at least partially overlaps with the uplink occasion in a time domain, a transmit power of the communication being associated with at least a portion of a reserved transmit power associated with the uplink occasion being allocated to the transmit power.

Aspect 20: The method of Aspect 19, wherein at least the portion of the reserved transmit power associated with the uplink occasion being allocated to the transmit power is associated with receiving the indication that the uplink occasion is unused.

Aspect 21: The method of any of Aspects 19-20, wherein the UE is associated with a transmit power limit associated with a sum of an MCG transmit power used for uplink transmission via the MCG and an SCG transmit power, including the transmit power, used for uplink transmission via the SCG, and a value of the transmit power being determined associated with the transmit power limit and associated with no transmit power being allocated for the uplink occasion, to the MCG transmit power, for the uplink occasion.

Aspect 22: The method of any of Aspects 19-21, wherein at least the portion of the reserved transmit power associated with the uplink occasion being allocated to the transmit power is associated with an amount of time between a first reception time of the indication that the uplink occasion is unused and a second reception time of the communication satisfying a threshold.

Aspect 23: The method of any of Aspects 19-22, wherein at least the portion of the reserved transmit power associated with the uplink occasion being allocated to the transmit power is associated with a first reception time of the indication that the uplink occasion is unused being at least an amount of time, indicated by a value of a time offset parameter, before a second reception time of the communication.

Aspect 24: The method of Aspect 23, further comprising: receiving a capability report, associated with the UE, indicating a processing capability of the UE associated with downlink control information, the value of the time offset parameter being associated with the processing capability.

Aspect 25: The method of any of Aspects 23-24, wherein the time offset parameter is associated with power sharing for unused uplink occasions.

Aspect 26: The method of any of Aspects 23-25, further comprising: transmitting an indication, for the UE, of the value of the time offset parameter configured by the network node.

Aspect 27: The method of any of Aspects 23-26, further comprising: transmitting an indication, for the UE, of one or more candidate values of the time offset parameter; and receiving an indication, associated with the UE, of the value, from the one or more candidate values, of the time offset parameter.

Aspect 28: The method of any of Aspects 23-27, further comprising: receiving an indication, associated with the UE, of the value of the time offset parameter; and transmitting an indication, for the UE, of whether the value of the time offset parameter is to be used.

Aspect 29: The method of any of Aspects 19-28, further comprising: receiving a capability report, associated with the UE, indicating that the UE supports adjusting a transmit power sharing between the MCG and the SCG associated with indicating unused uplink occasions, and at least the portion of the reserved transmit power associated with the uplink occasion being allocated to the transmit power is associated with receiving the capability report.

Aspect 30: The method of any of Aspects 19-29, wherein the indication that the uplink occasion is unused is communicated via the MCG.

Aspect 31: The method of any of Aspects 19-30, wherein the indication that the uplink occasion is unused is communicated via the SCG.

Aspect 32: The method of any of Aspects 19-31, wherein the uplink occasion is a configured grant occasion.

Aspect 33: The method of Aspect 32, wherein transmitting the indication of the uplink occasion comprises: transmitting a configured grant configuration, associated with the MCG, indicating the configured grant occasion.

Aspect 34: The method of any of Aspects 19-33, wherein transmitting the indication of the uplink occasion comprises: transmitting scheduling information, associated with the MCG, indicating the uplink occasion.

Aspect 35: The method of Aspect 34, wherein the scheduling information is included in downlink control information.

Aspect 36: The method of any of Aspects 19-35, wherein the uplink occasion is a physical uplink shared channel (PUSCH) occasion.

Aspect 37: An apparatus for wireless communication at a device, comprising a processor; memory coupled with the processor; and instructions stored in the memory and executable by the processor to cause the apparatus to perform the method of one or more of Aspects 1-36.

Aspect 38: A device for wireless communication, comprising a memory and one or more processors coupled to the memory, the one or more processors configured to perform the method of one or more of Aspects 1-36.

Aspect 39: An apparatus for wireless communication, comprising at least one means for performing the method of one or more of Aspects 1-36.

Aspect 40: A non-transitory computer-readable medium storing code for wireless communication, the code comprising instructions executable by a processor to perform the method of one or more of Aspects 1-36.

Aspect 41: A non-transitory computer-readable medium storing a set of instructions for wireless communication, the set of instructions comprising one or more instructions that, when executed by one or more processors of a device, cause the device to perform the method of one or more of Aspects 1-36.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term “component” is intended to be broadly construed as hardware or a combination of hardware and software. “Software” shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a “processor” is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

As used herein, the term "determine" or "determining" encompasses a wide variety of actions and, therefore, "determining" can include calculating, computing, processing, deriving, investigating, looking up (such as via looking up in a table, a database or another data structure), inferring, ascertaining, measuring, and the like. Also, "determining" can include receiving (such as receiving information), accessing (such as accessing data stored in memory), transmitting (such as transmitting information) and the like. Also, "determining" can include resolving, selecting, obtaining, choosing, establishing and other such similar actions.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, as used herein, "based on" is intended to be interpreted in the inclusive sense, unless otherwise explicitly indicated. For example, "based on" may be used interchangeably with "based at least in part on," "associated with", or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions or information. Also, as used herein, the term "or" is intended to be inclusive when used in a series and may be used interchangeably with "and/or," unless explicitly stated otherwise (for example, if used in combination with "either" or "only one of").

What is claimed is:

1. A user equipment (UE), comprising:

one or more antennas; and a processing system that includes one or more processors and one or more memories that store code for the one or more processors, the processing system configured to cause the UE to:

receive an indication of an uplink occasion for a master cell group (MCG);

transmit an indication that the uplink occasion is unused; and transmit, via a secondary cell group (SCG) and using a transmit power, a communication that at least partially overlaps with the uplink occasion in a time domain, wherein at least a portion of a reserved transmit power, associated with the unused uplink occasion, is allocated to the transmit power, wherein the transmit power is based on a value of a time offset parameter, and wherein the value of the time offset parameter indicates an amount of time between a first transmission time of the indication that the uplink occasion is unused and a second transmission time of the communication.

2. The UE of claim 1, wherein the allocation of at least the portion of the reserved transmit power associated with the uplink occasion to the transmit power is in response to transmitting the indication that the uplink occasion is unused.

3. The UE of claim 1, wherein the portion of the reserved transmit power is based on the amount of time satisfying a threshold.

4. The UE of claim 1, wherein the processing system is further configured to cause the UE to:

transmit a capability report indicating a processing capability of the UE associated with downlink control information, the value of the time offset parameter being associated with the processing capability.

5. The UE of claim 1, wherein the processing system is further configured to cause the UE to:

receive, from a network node, an indication of the value of the time offset parameter configured by the network node.

6. The UE of claim 1, wherein the processing system is further configured to cause the UE to:

transmit, to a network node, an indication of the value of the time offset parameter; and receive, from the network node, an indication of whether the value of the time offset parameter is to be used.

7. The UE of claim 1, wherein the processing system is further configured to cause the UE to:

transmit a capability report indicating that the UE supports adjusting a transmit power sharing between the MCG and the SCG associated with indicating unused uplink occasions, and allocating at least the portion of the reserved transmit power associated with the uplink occasion to the transmit power being associated with transmitting the capability report.

8. The UE of claim 1, wherein the uplink occasion is a configured grant occasion, and wherein, to cause the UE to receive the indication of the uplink occasion, the processing system is configured to cause the UE to:

receive a configured grant configuration, associated with the MCG, indicating the configured grant occasion.

9. The UE of claim 1, wherein, to cause the UE to receive the indication of the uplink occasion, the processing system is configured to cause the UE to:

receive scheduling information, associated with the MCG, indicating the uplink occasion.

10. The UE of claim 1, wherein the processing system is further configured to cause the UE to:

receive, from a network node, an indication of one or more candidate values of the time offset parameter;

select the value of the time offset parameter from the one or more candidate values; and transmit, to the network node, an indication of the selected value of the time offset parameter.

11. The UE of claim 1, wherein the UE is associated with a transmit power limit associated with a sum of an MCG transmit power used for uplink transmission via the MCG and an SCG transmit power, including the transmit power, used for uplink transmission via the SCG, and a value of the transmit power being determined associated with the transmit power limit and by allocating no transmit power, to the MCG transmit power, for the uplink occasion.

12. A network node, comprising:

one or more antennas; and a processing system that includes one or more processors and one or more memories that store code for the one or more processors, the processing system configured to cause the network node to:

transmit an indication of an uplink occasion for a user equipment (UE) and a master cell group (MCG) of the UE;

receive an indication that the uplink occasion is unused by the UE; and receive, via a secondary cell group (SCG) of the UE, a communication that at least partially overlaps with the uplink occasion in a time domain, wherein at least a portion of a reserved transmit power, associated with the unused uplink occasion, is allocated to a transmit power, wherein the transmit power is based on a value of a time offset parameter, and wherein the value of the time offset parameter indicates an amount of time between a first reception time of the indication that the uplink occasion is unused and a second reception time of the communication.

13. The network node of claim 12, wherein the UE is associated with a transmit power limit associated with a sum of an MCG transmit power used for uplink transmission via the MCG and an SCG transmit power, including the transmit power, used for uplink transmission via the SCG, and a value of the transmit power being determined associated with the transmit power limit and associated with no transmit power being allocated for the uplink occasion, to the MCG transmit power, for the uplink occasion.

14. The network node of claim 12, wherein the time offset parameter is associated with power sharing for unused uplink occasions.

15. The network node of claim 12, wherein the processing system is further configured to cause the network node to:

transmit an indication, for the UE, of one or more candidate values of the time offset parameter; and receive an indication, associated with the UE, of the value, from the one or more candidate values, of the time offset parameter.

16. The network node of claim 12, wherein the processing system is further configured to cause the network node to:

receive a capability report, associated with the UE, indicating that the UE supports adjusting a transmit power sharing between the MCG and the SCG associated with indicating unused uplink occasions, and at least the portion of the reserved transmit power associated with the uplink occasion being allocated to the transmit power is associated with receiving the capability report.

17. The network node of claim 12, wherein the uplink occasion is a configured grant occasion, and wherein, to cause the network node to transmit the indication of the uplink occasion, the processing system is configured to cause the network node to:

transmit a configured grant configuration, associated with the MCG, indicating the configured grant occasion.

18. The network node of claim 12, wherein, to cause the network node to transmit the indication of the uplink occasion, the processing system is configured to cause the network node to:

transmit scheduling information, associated with the MCG, indicating the uplink occasion.

19. A method of wireless communication performed at a user equipment (UE), comprising:

receiving an indication of an uplink occasion for a master cell group (MCG);

transmitting an indication that the uplink occasion is unused; and transmitting, via a secondary cell group (SCG) and using a transmit power, a communication that at least partially overlaps with the uplink occasion in a time domain, wherein at least a portion of a reserved transmit power, associated with the unused uplink occasion, is allocated to the transmit power, wherein the transmit power is based on a value of a time offset parameter, and wherein the value of the time offset parameter indicates an amount of time between a first transmission time of the indication that the uplink occasion is unused and a second transmission time of the communication.

20. The method of claim 19, wherein the UE is associated with a transmit power limit associated with a sum of an MCG transmit power used for uplink transmission via the MCG and an SCG transmit power, including the transmit power, used for uplink transmission via the SCG, and a value of the transmit power being determined associated with the transmit power limit and by allocating no transmit power, to the MCG transmit power, for the uplink occasion.

21. The method of claim 19, wherein the time offset parameter is associated with power sharing for unused uplink occasions.

22. The method of claim 19, further comprising:

receiving, from a network node, an indication of one or more candidate values of the time offset parameter;

selecting the value of the time offset parameter from the one or more candidate values; and transmitting, to the network node, an indication of the value of the time offset parameter.

23. The method of claim 19, further comprising:

transmitting, to a network node, an indication of the value of the time offset parameter; and receiving, from the network node, an indication of whether the value of the time offset parameter is to be used.

24. The method of claim 19, further comprising:

transmitting a capability report indicating that the UE supports adjusting a transmit power sharing between the MCG and the SCG associated with indicating unused uplink occasions, and allocating at least the portion of the reserved transmit power associated with the uplink occasion to the transmit power being associated with transmitting the capability report.

25. The method of claim 19, wherein the uplink occasion is a configured grant occasion, and wherein receiving the indication of the uplink occasion comprises receiving a configured grant configuration, associated with the MCG, indicating the configured grant occasion.

26. A method of wireless communication performed at a network node, comprising:

transmitting an indication of an uplink occasion for a user equipment (UE) and a master cell group (MCG) of the UE;

receiving an indication that the uplink occasion is unused by the UE; and receiving, via a secondary cell group (SCG) of the UE, a communication that at least partially overlaps with the uplink occasion in a time domain, wherein at least a portion of a reserved transmit power, associated with the unused uplink occasion, is allocated to a transmit power, wherein the transmit power is based on a value of a time offset parameter, and wherein the value of the time offset parameter indicates an amount of time between a first reception time of the indication that the uplink occasion is unused and a second reception time of the communication.

27. The method of claim 26, wherein at least the portion of the reserved transmit power associated with the uplink occasion being allocated to the transmit power is associated with receiving the indication that the uplink occasion is unused.

28. The method of claim 26, wherein at least the portion of the reserved transmit power is based on the amount of time satisfying a threshold.

29. The method of claim 26, further comprising:

receiving a capability report, associated with the UE, indicating a processing capability of the UE associated with downlink control information, the value of the time offset parameter being associated with the processing capability.

30. The method of claim 26, further comprising:

transmitting an indication, for the UE, of one or more candidate values of the time offset parameter; and receiving an indication, associated with the UE, of the value, from the one or more candidate values, of the time offset parameter.

* * * * *